US011909143B2

(12) United States Patent
Bowen et al.

(10) Patent No.: US 11,909,143 B2
(45) **Date of Patent: *Feb. 20, 2024**

(54) ELECTRICAL RECEPTACLE WITH LOCKING FEATURE

(71) Applicant: CHATSWORTH PRODUCTS, INC., Agoura Hills, CA (US)

(72) Inventors: Jonathan Bowen, Austin, TX (US); Samuel Rodriguez, Leander, TX (US)

(73) Assignee: Chatsworth Products, Inc., Simi Valley, CA (US)

( * ) Notice: Subject to any disclaimer, the term of this patent is extended or adjusted under 35 U.S.C. 154(b) by 52 days.

This patent is subject to a terminal disclaimer.

(21) Appl. No.: 17/724,227

(22) Filed: Apr. 19, 2022

(65) Prior Publication Data

US 2022/0239039 A1 Jul. 28, 2022

Related U.S. Application Data

(63) Continuation of application No. 17/106,711, filed on Nov. 30, 2020, now Pat. No. 11,322,891, which is a (Continued)

(51) Int. Cl.
*H01R 13/625* (2006.01)
*H01R 13/639* (2006.01)
(Continued)

(52) U.S. Cl.
CPC ..... *H01R 13/6395* (2013.01); *H01R 13/6392* (2013.01); *H01R 43/26* (2013.01); (Continued)

(58) Field of Classification Search
CPC ............ H01R 13/6392; H01R 13/6395; H01R 13/743; H01R 24/30; H01R 24/78; H01R 43/26
(Continued)

(56) References Cited

U.S. PATENT DOCUMENTS 1,835,251 A 12/1931 Wetstein
2,271,463 A 1/1942 Reeves
(Continued)

FOREIGN PATENT DOCUMENTS

BR PI0413990 A 7/2006
CA 2535374 A1 3/2005
(Continued)

OTHER PUBLICATIONS

Information Disclosure Statement (IDS) Letter Regarding Common Patent Application(S), dated Jun. 23, 2022.
(Continued)

*Primary Examiner* — Abdullah A Riyami
*Assistant Examiner* — Vladimir Imas
(74) *Attorney, Agent, or Firm* — Tillman Wright, PLLC; James D. Wright; David R. Higgins

(57) ABSTRACT

An electrical receptacle unit with locking feature includes a receptacle adapted to be electrically connected to a source of electricity. The receptacle includes an electrical fitting having electrical contacts contained therein and/or extending therefrom, a socket surrounding the electrical fitting, and a plate disposed at a front of the socket. The electrical receptacle unit further includes a locking bracket that includes a central portion having first and second ends, a lock tab extending from a side of the central portion, and a pair of support arms, each extending forwardly from a respective one of the first and second ends. The locking bracket is pivotably secured to the plate, with at least a portion of each support arm positioned within a respective notched area of the plate. The locking bracket is pivotable relative to the plate between a first position, whereby a plug electrically seated within the socket is unobstructed, and a second position, whereby the plug electrically seated within the socket is obstructed from removal by the lock tab.

20 Claims, 35 Drawing Sheets

Related U.S. Application Data continuation of application No. 16/743,798, filed on Jan. 15, 2020, now Pat. No. 10,855,030, which is a continuation of application No. 16/267,633, filed on Feb. 5, 2019, now Pat. No. 10,547,145.

(60) Provisional application No. 62/732,872, filed on Sep. 18, 2018, provisional application No. 62/626,346, filed on Feb. 5, 2018.

(51) Int. Cl.
*H01R 43/26* (2006.01)
*H01R 13/74* (2006.01)
*H01R 24/30* (2011.01)
*H01R 24/78* (2011.01)

(52) U.S. Cl.
CPC ............ *H01R 13/743* (2013.01); *H01R 24/30* (2013.01); *H01R 24/78* (2013.01)

(58) Field of Classification Search
USPC .......................................................... 439/346
See application file for complete search history.

(56) References Cited

U.S. PATENT DOCUMENTS 2,390,752 A 12/1945 Tinnerman
2,430,555 A 11/1947 Burke
2,875,804 A 3/1959 Flora
3,054,025 A 9/1962 Edmunds
3,192,823 A 7/1965 Munse
3,202,788 A 8/1965 George
3,263,132 A 7/1966 Bangert, Jr.
3,379,090 A 4/1968 Parkin
3,569,909 A 3/1971 Garver
3,573,716 A 4/1971 Garver
3,633,075 A 1/1972 Hawkins
3,767,977 A 10/1973 Bachman
3,842,393 A 10/1974 Glover et al.
3,910,671 A 10/1975 Townsend
3,989,343 A 11/1976 Lucius et al.
4,004,197 A 1/1977 Hawkes, Jr.
4,157,582 A 6/1979 Myers
4,375,933 A 3/1983 Hassler et al.
4,417,736 A 11/1983 Herrmann, Jr.
4,524,937 A 6/1985 Zizan
4,531,800 A 7/1985 Avener
4,671,594 A 6/1987 Ohtsuki et al.
4,675,900 A 6/1987 Temkin
4,708,413 A 11/1987 Schroeder
4,782,245 A 11/1988 Henry
4,940,424 A 7/1990 Odbert
5,104,335 A 4/1992 Conley et al.
5,338,211 A 8/1994 Kodama et al.
5,348,495 A 9/1994 Kasden
5,370,553 A 12/1994 Zimmerman
5,391,084 A 2/1995 Krietzman
5,547,390 A 8/1996 Laherty
5,568,362 A 10/1996 Hansson
D375,292 S 11/1996 D'Amato
5,595,494 A 1/1997 Wiebe
5,626,316 A 5/1997 Smigel et al.
5,655,924 A 8/1997 Cross et al.
5,707,248 A 1/1998 Matsumura
5,752,682 A 5/1998 Anderson
5,788,087 A 8/1998 Orlando
5,859,580 A 1/1999 Hashizawa et al.
5,921,795 A 7/1999 Weener et al.
5,921,806 A * 7/1999 Shuey ................ H01R 13/5841
439/464
5,934,919 A 8/1999 Cross et al.
5,954,525 A 9/1999 Siegal et al.
5,989,052 A 11/1999 Fields et al.
6,071,142 A 6/2000 Blackman
6,127,631 A 10/2000 Green et al.
6,144,549 A 11/2000 Moss et al.
6,168,249 B1 1/2001 Chien
6,170,784 B1 1/2001 MacDonald et al.
6,196,859 B1 3/2001 Garlarza
6,220,880 B1 4/2001 Lee et al.
6,231,379 B1 5/2001 Shen
6,250,816 B1 6/2001 Johnston et al.
6,250,956 B1 * 6/2001 Pulizzi .................. H02B 1/044
439/535
6,280,243 B1 8/2001 Liu et al.
6,315,580 B1 11/2001 Hurtubise et al.
6,364,718 B1 4/2002 Polgar et al.
D462,056 S 8/2002 Chung
6,461,052 B1 10/2002 Hines et al.
6,541,705 B1 4/2003 McGrath
6,584,267 B1 6/2003 Caveney et al.
6,609,034 B1 8/2003 Behrens et al.
6,647,197 B1 11/2003 Marrs et al.
6,663,435 B2 12/2003 Lincoln et al.
6,671,756 B1 12/2003 Thomas et al.
6,672,896 B1 1/2004 Li
6,738,555 B1 5/2004 Cooke et al.
6,746,193 B1 6/2004 Drake
6,760,531 B1 7/2004 Solheid et al.
6,761,583 B2 7/2004 Ortowski et al.
6,769,930 B1 8/2004 McDevitt, Jr.
6,773,285 B2 8/2004 Bernat et al.
6,781,491 B2 8/2004 Whipple et al.
6,782,617 B2 8/2004 Pulizzi
6,818,834 B1 11/2004 Lin
6,835,094 B2 12/2004 Matsushita
6,843,674 B1 1/2005 Young
6,845,207 B2 1/2005 Schray
6,866,541 B2 3/2005 Barker et al.
6,923,555 B2 8/2005 Byggmastar
6,937,461 B1 8/2005 Donahue, IV
6,981,893 B2 1/2006 Barker et al.
6,992,247 B2 1/2006 Rasmussen et al.
7,014,493 B1 3/2006 Battard
7,043,543 B2 5/2006 Ewing et al.
7,081,004 B1 7/2006 Puzio
7,092,258 B2 8/2006 Hardt et al.
7,094,099 B2 * 8/2006 Daggett ............... H01R 13/745
439/567
7,097,047 B2 8/2006 Lee et al.
7,101,215 B2 9/2006 Woellner et al.
7,104,830 B1 9/2006 Diaz
7,141,891 B2 11/2006 McNally et al.
7,156,681 B2 1/2007 Kaneda et al.
7,171,461 B2 1/2007 Ewing et al.
7,200,316 B2 4/2007 Giraud et al.
7,232,330 B2 6/2007 Woellner et al.
7,232,337 B1 6/2007 Pepe et al.
D549,650 S 8/2007 Russell et al.
7,268,998 B2 9/2007 Ewing et al.
7,277,614 B2 10/2007 Cody et al.
7,284,996 B2 * 10/2007 Kidman ................ H02G 3/081
439/535
7,285,027 B2 10/2007 McGrath et al.
7,289,334 B2 10/2007 Behrens et al.
7,312,980 B2 12/2007 Ewing et al.
D559,184 S 1/2008 Russell et al.
D562,766 S 2/2008 Yang
7,329,140 B2 2/2008 O'Connell et al.
7,330,629 B2 2/2008 Cooke et al.
D564,964 S 3/2008 Caine et al.
7,345,241 B2 3/2008 Caveney et al.
7,352,947 B2 4/2008 Phung et al.
7,362,941 B2 4/2008 Rinderer et al.
7,365,964 B2 4/2008 Donahue, IV
7,368,830 B2 5/2008 Cleveland et al.
7,406,242 B1 7/2008 Braga
D575,237 S 8/2008 Shiga et al.
7,414,329 B2 8/2008 Cleveland et al.
D576,552 S 9/2008 Caine et al.
7,455,546 B1 11/2008 Yoon et al.
7,472,970 B2 1/2009 Bergesch et al.
7,480,154 B2 1/2009 Lawrence et al.

(56) References Cited

U.S. PATENT DOCUMENTS

| | | | | |
|---|---|---|---|---|
| 7,510,421 | B2 | 3/2009 | Fransen et al. | |
| 7,540,749 | B1 | 6/2009 | Hall et al. | |
| 7,551,456 | B2 | 6/2009 | Behrens et al. | |
| 7,559,788 | B2 | 7/2009 | Legg | |
| 7,637,771 | B2 | 12/2009 | Laursen | |
| 7,661,982 | B2 | 2/2010 | Tachi et al. | |
| 7,686,647 | B1 | 3/2010 | Hong | |
| 7,702,771 | B2 | 4/2010 | Ewing et al. | |
| 7,718,889 | B2 | 5/2010 | Rasmussen et al. | |
| 7,719,835 | B1 | 5/2010 | Schluter | |
| 7,722,380 | B1 | 5/2010 | West et al. | |
| 7,751,206 | B2 | 7/2010 | Kosacek et al. | |
| 7,758,371 | B2 | 7/2010 | Carmitchel | |
| 7,777,365 | B2 | 8/2010 | Cleveland et al. | |
| 7,778,513 | B2 | 8/2010 | Rinderer et al. | |
| 7,789,606 | B2 | 9/2010 | Kosidlo, IV et al. | |
| 7,789,679 | B2 | 9/2010 | Wu et al. | |
| 7,816,602 | B2 | 10/2010 | Landry et al. | |
| D631,731 | S | 2/2011 | Chen | |
| 7,891,993 | B2 | 2/2011 | Huber et al. | |
| 7,938,371 | B2 | 5/2011 | Oga et al. | |
| 7,957,139 | B2 | 6/2011 | Davis et al. | |
| 7,974,105 | B2 | 7/2011 | Dean, Jr. et al. | |
| 8,029,308 | B2 | 10/2011 | Saruwatari | |
| 8,033,867 | B1 * | 10/2011 | Kessler .................. | H01R 27/00 439/652 |
| 8,062,049 | B2 * | 11/2011 | Tobey .................. | H01R 13/514 439/345 |
| 8,152,554 | B2 | 4/2012 | Chapel et al. | |
| D660,235 | S | 5/2012 | Liang-Hsu et al. | |
| 8,238,080 | B2 | 8/2012 | McGinn | |
| 8,337,236 | B2 | 12/2012 | Shu | |
| 8,357,016 | B2 * | 1/2013 | Schumacher ........ | H01R 13/516 439/814 |
| D677,629 | S | 3/2013 | Corona | |
| D678,200 | S | 3/2013 | Corona | |
| D678,202 | S | 3/2013 | Corona | |
| 8,411,465 | B2 | 4/2013 | Dean, Jr. et al. | |
| 8,437,147 | B2 | 5/2013 | Dean, Jr. et al. | |
| D687,778 | S | 8/2013 | Utz | |
| 8,529,288 | B2 | 9/2013 | Montena et al. | |
| 8,746,466 | B2 | 6/2014 | Taylor | |
| 8,764,480 | B2 | 7/2014 | Natoli et al. | |
| 8,882,536 | B2 * | 11/2014 | Utz ...................... | H05K 7/1492 439/535 |
| 9,054,449 | B2 | 6/2015 | Utz et al. | |
| 9,106,003 | B2 | 8/2015 | Anderson et al. | |
| 9,197,040 | B2 | 11/2015 | Mills et al. | |
| 9,306,313 | B2 | 4/2016 | Heggemann et al. | |
| 9,509,086 | B2 | 11/2016 | Utz et al. | |
| 9,523,379 | B2 | 12/2016 | Stothers | |
| 9,531,126 | B2 * | 12/2016 | Krietzman ........... | H01R 13/639 |
| 9,531,129 | B2 | 12/2016 | de Boer | |
| 9,601,865 | B2 | 3/2017 | Berengut et al. | |
| 9,844,143 | B2 | 12/2017 | Utz | |
| 9,903,407 | B2 | 2/2018 | Hattori et al. | |
| 10,187,995 | B2 | 1/2019 | Utz | |
| 10,374,360 | B2 | 8/2019 | Utz et al. | |
| 10,547,145 | B2 | 1/2020 | Bowen et al. | |
| 10,584,082 | B2 | 3/2020 | Utz et al. | |
| 10,855,030 | B2 | 12/2020 | Bowen | |
| 11,322,891 | B2 | 5/2022 | Bowen et al. | |
| 2001/0027054 | A1 * | 10/2001 | Fukuda ................ | H01R 13/641 439/489 |
| 2002/0064997 | A1 * | 5/2002 | Noguchi .............. | H01R 13/641 439/607.01 |
| 2002/0119693 | A1 | 8/2002 | Chen | |
| 2002/0173197 | A1 * | 11/2002 | Endo .................... | H01R 13/641 439/489 |
| 2002/0176681 | A1 | 11/2002 | Puetz et al. | |
| 2003/0118311 | A1 | 6/2003 | Thibault et al. | |
| 2003/0190036 | A1 | 10/2003 | Mandoza | |
| 2004/0050808 | A1 | 3/2004 | Krampotich et al. | |
| 2004/0055232 | A1 | 3/2004 | Jette | |
| 2004/0077212 | A1 | 4/2004 | Pulizzi | |
| 2004/0146266 | A1 | 7/2004 | Solheid et al. | |
| 2004/0231875 | A1 | 11/2004 | Rasmussen et al. | |
| 2005/0050272 | A1 | 3/2005 | Behrens et al. | |
| 2005/0057912 | A1 | 3/2005 | Hardt et al. | |
| 2005/0111810 | A1 | 5/2005 | Giraud et al. | |
| 2005/0259383 | A1 | 11/2005 | Ewing | |
| 2006/0103270 | A1 | 5/2006 | Bergesch et al. | |
| 2006/0118321 | A1 | 6/2006 | Herring et al. | |
| 2006/0118685 | A1 | 6/2006 | Schluter et al. | |
| 2006/0154503 | A1 | 7/2006 | Kidman | |
| 2006/0162948 | A1 | 7/2006 | Rinderer et al. | |
| 2006/0171075 | A1 | 8/2006 | Caveney et al. | |
| 2006/0234535 | A1 | 10/2006 | Ohtaka et al. | |
| 2006/0263029 | A1 | 11/2006 | Mudd et al. | |
| 2006/0283816 | A1 | 12/2006 | Moore et al. | |
| 2007/0049099 | A1 | 3/2007 | Potters | |
| 2007/0097659 | A1 | 5/2007 | Behrens et al. | |
| 2007/0149020 | A1 | 6/2007 | Matsumoto | |
| 2007/0207666 | A1 | 9/2007 | Caveney et al. | |
| 2008/0030947 | A1 | 2/2008 | Behrens et al. | |
| 2008/0062654 | A1 | 3/2008 | Mattlin et al. | |
| 2008/0062655 | A1 | 3/2008 | Laursen et al. | |
| 2008/0076291 | A1 | 3/2008 | Ewing et al. | |
| 2008/0130262 | A1 | 6/2008 | Rinderer et al. | |
| 2008/0180917 | A1 | 7/2008 | Lawrence | |
| 2008/0194137 | A1 | 8/2008 | Kuo | |
| 2008/0248697 | A1 | 10/2008 | Whiteman et al. | |
| 2008/0261437 | A1 | 10/2008 | Kobayashi et al. | |
| 2008/0311781 | A1 | 12/2008 | Wojcik et al. | |
| 2008/0318473 | A1 | 12/2008 | Morikawa et al. | |
| 2009/0038845 | A1 | 2/2009 | Fransen et al. | |
| 2009/0206217 | A1 | 8/2009 | Wilson et al. | |
| 2009/0273915 | A1 | 11/2009 | Dean, Jr. et al. | |
| 2010/0051308 | A1 | 3/2010 | Hansen et al. | |
| 2010/0193754 | A1 | 8/2010 | Garza et al. | |
| 2010/0200707 | A1 | 8/2010 | Garza et al. | |
| 2010/0296229 | A1 | 11/2010 | Meux et al. | |
| 2011/0045696 | A1 | 2/2011 | Nakamura | |
| 2011/0083873 | A1 | 4/2011 | Hartman et al. | |
| 2011/0177710 | A1 | 7/2011 | Tobey | |
| 2011/0201228 | A1 | 8/2011 | Schumacher et al. | |
| 2011/0211328 | A1 | 9/2011 | Dean, Jr. et al. | |
| 2011/0211329 | A1 | 9/2011 | Dean, Jr. et al. | |
| 2011/0223784 | A1 | 9/2011 | Jiang et al. | |
| 2011/0256750 | A1 | 10/2011 | Chen | |
| 2013/0040485 | A1 | 2/2013 | Ngo | |
| 2013/0196532 | A1 | 8/2013 | Utz et al. | |
| 2013/0196535 | A1 * | 8/2013 | Utz ........................ | H01R 12/00 439/536 |
| 2013/0215581 | A1 * | 8/2013 | Utz ........................ | H05K 3/325 361/752 |
| 2015/0180175 | A1 | 6/2015 | Yu et al. | |
| 2015/0180176 | A1 | 6/2015 | Yu et al. | |
| 2015/0222047 | A1 | 8/2015 | Utz et al. | |
| 2015/0249326 | A1 | 9/2015 | Krietzman et al. | |
| 2015/0357758 | A1 | 12/2015 | Krietzman et al. | |
| 2016/0211611 | A1 | 7/2016 | Cruz | |
| 2017/0042030 | A1 | 2/2017 | Utz | |
| 2017/0077649 | A1 | 3/2017 | Utz et al. | |
| 2017/0104294 | A1 * | 4/2017 | Krietzman ......... | H01R 13/6392 |
| 2018/0098429 | A1 | 4/2018 | Utz | |
| 2019/0081440 | A1 | 3/2019 | Winders et al. | |
| 2019/0150286 | A1 | 5/2019 | Utz | |
| 2019/0245305 | A1 | 8/2019 | Bowen et al. | |
| 2020/0153166 | A1 | 5/2020 | Bowen | |
| 2021/0083430 | A1 | 3/2021 | Bowen et al. | |

FOREIGN PATENT DOCUMENTS

| | | | |
|---|---|---|---|
| CN | 1842948 | A | 10/2006 |
| CN | 106463887 | A | 2/2017 |
| CN | 108431433 | A | 8/2018 |
| DE | 3105808 | A1 | 9/1982 |
| EP | 1557910 | A1 | 7/2005 |
| GB | 2082402 | A | 3/1982 |
| JP | 2017-520887 | | 7/2017 |
| JP | 2019-502069 | | 1/2019 |
| JP | 7066618 | | 5/2022 |

(56) References Cited

FOREIGN PATENT DOCUMENTS

| | | | |
|---|---|---|---|
| WO | 1999018580 | A2 | 4/1999 |
| WO | 2005025374 | A2 | 3/2005 |
| WO | 2005025374 | A3 | 12/2005 |
| WO | 2006055506 | A2 | 5/2006 |
| WO | 2009089008 | A2 | 7/2009 |
| WO | 2015188116 | A1 | 12/2015 |

OTHER PUBLICATIONS

"International Preliminary Report on Patentability" and "Written Opinion" of the International Search Authority (ISA/US) in Chatsworth Products, Inc., International Patent Application Serial No. PCT/US2015/034511, dated Dec. 6, 2016 (8 pages).

"International Search Report" and "Written Opinion" of the International Search Authority (ISA/US) in Chatsworth Products, Inc., International Patent Application Serial No. PCT/US2015/034511, dated Sep. 15, 2015 (13 pages).

"Extended European Search Report" and "Written Opinion" of the European Patent Office in Chatsworth Products, Inc. European Patent Application Serial No. 15802723.5, dated Nov. 7, 2017 (8 pages).

Wiremold, Plug-In Outlet Center® Units Specification—ED795R4, updated Mar. 2003 (8 pages).

Tripp-Lite, C14 Plug Lock Insert for C13 Outlets, <http://www.tripplite.com/c14-plug-lock-insert-for-c13-outletsblue~PLC13BL/>, dated as of May 30, 2013, accessed Aug. 25, 2015 (4 pages).

* cited by examiner prior art prior art

110

110

210

ELECTRICAL RECEPTACLE WITH LOCKING FEATURE

CROSS-REFERENCE TO RELATED APPLICATIONS

The present application is a U.S. continuation patent application of, and claims priority under 35 U.S.C. § 120 to, U.S. nonprovisional patent application Ser. No. 17/106,711, filed Nov. 30, 2020, which '711 application published as U.S. Patent Application Publication No. US 2021/0083430 A1 on Mar. 18, 2021 and issued as U.S. Pat. No. 11,322,891 on May 3, 2022, which '711 application, the publication thereof, and the patent issuing therefrom are each incorporated herein by reference in their entirety, and which '711 is a U.S. continuation patent application of, and claims priority under 35 U.S.C. § 120 to, U.S. nonprovisional patent application Ser. No. 16/743,798, filed Jan. 15, 2020, which '798 application published as U.S. Patent Application Publication No. US 2020/0153166 A1 on May 14, 2020 and issued as U.S. Pat. No. 10,855,030 on Dec. 1, 2020, which '798 application, the publication thereof, and the patent issuing therefrom are each incorporated herein by reference in their entirety, and which '798 is a U.S. continuation patent application of, and claims priority under 35 U.S.C. § 120 to, U.S. nonprovisional patent application Ser. No. 16/267,633, filed Feb. 5, 2019, which '633 application published as U.S. Patent Application Publication No. US 2019/0245305 A1 on Aug. 8, 2019 and issued as U.S. Pat. No. 10,547,145 on Jan. 28, 2020, which '633 application, the publication thereof, and the patent issuing therefrom are each incorporated herein by reference in their entirety, and which '633 application is a U.S. nonprovisional patent application of, and claims priority under 35 U.S.C. § 119(e) to, U.S. provisional patent application Ser. No. 62/626,346, filed Feb. 5, 2018, which '346 application is incorporated by reference herein in its entirety, and which '633 application is a U.S. nonprovisional patent application of, and claims priority under 35 U.S.C. § 119(e) to, U.S. provisional patent application Ser. No. 62/732,872, filed Sep. 18, 2018, which '872 application is incorporated by reference herein in its entirety. Additionally, the entirety of the following commonly-assigned U.S. patent application, its publication and the patent issuing therefore are each incorporated by reference herein: U.S. nonprovisional patent application Ser. No. 14/732,234, filed Jun. 5, 2015, which '234 application published on Dec. 10, 2015 as U.S. Patent Application Publication No. US 2015/0357758 A1 and issued on Dec. 27, 2016 as U.S. Pat. No. 9,531,126.

COPYRIGHT STATEMENT

All of the material in this patent document is subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

BACKGROUND OF THE PRESENT INVENTION

Field of the Present Invention

The present invention relates generally to power cords and their connectors, and, in particular, to plug retention mechanisms for electrical receptacles.

Background

Power cords are ubiquitous in the developed world, providing power from a conventional distribution system to electrically-powered devices of a very wide variety of types. Each power cord usually includes a cable with a plug or other electrical fitting at each end. For residential devices, most power cords utilize a plug having a standard size and arrangement of electrical connectors, with the particular standard being specific to a particular country or set of countries. Power cords for devices having electrical requirements that are different from that standard frequently utilize different sizes and/or arrangements to ensure that the wrong plug is not connected thereto.

In the computer industry, specialized plug/receptacle pairs are likewise used for various electrical needs. The plug/receptacle pairs are typically selected from conventional receptacle designs such as those set forward by IEC 60320. According to the standard, the specifications of corresponding female and male pairs of electrical connectors (such as C13 and C14 types) are defined such that the physical attributes of those connectors are standardized. By way of example, FIG. 1A is a front isometric view of a conventional female electrical receptacle. The illustrated receptacle is in the form of a panel-mount C13-type receptacle, but it will be appreciated that various other receptacle types with different electrical connection configurations also exist. The receptacle includes a female fitting surrounded by a socket. Female electrical contacts are contained within the female fitting. A plate may be provided on the front of, and typically integral with, the socket. The receptacle may be mounted in various fixtures using screws, solder joints, or in other known ways; the receptacle (and especially the socket) may include additional features to facilitate such mounting. The female electrical receptacle is adapted to receive a corresponding male electrical receptacle (not shown in FIG. 1A). Such a male receptacle would typically include a male fitting from which male electrical contacts extend as well as a socket surrounding the male electrical contacts.

A common problem within the computer industry and generally is the accidental dislocation of a particular plug (connector) from a receptacle. Because each plug commonly has a cord extending therefrom, it is easy to generate enough force, accidentally, to loosen the plug in the receptacle or even to pull it out entirely. Contributing to the problem is the fact that many connectors are designed to be removed easily by hand, which means that the force necessary to loosen or remove the plug is often not particularly great. The problem can be particularly vexing around power distribution units (PDUs).

As a result, many devices and techniques have been used to hold plugs in place. Some such devices include plugs with threaded fittings (e.g., screws) that may be coupled to corresponding fittings on the receptacle. Others involve a retention element installed on the cord that can be attached to a stud or other element of the receptacle or PDU (e.g., bars or brackets fastened to the receptacle or PDU once the plug or plugs are in place). However, these devices and techniques present additional challenges that must be overcome, such as the need for special connector designs as well as their overall difficulty of use (particularly with regard to challenges associated with installation and removal).

Another known device for retaining a plug in position involves a receptacle that includes an integrated lock housing, such as the device shown in FIG. 1B. In FIG. 1B, a lock housing P20 extends from the front of the electrical receptacle P10. As the plug (not shown in FIG. 1B) is guided into the lock housing opening P30 and establishes an electrical connection, lock tabs P26 on the lock housing P20 snap into place against the plug, thereby retaining the plug in a locked position. However, as should also be apparent from FIG. 1B, the lock housing P20 extends the height of the receptacle by a significant margin, which may inhibit use of the receptacle in certain environments where space is limited. Furthermore, the fact of the lock housing P20 being integrated with the receptacle means that the receptacle must be entirely removed in order to convert the receptacle from a "locking" receptacle to a "non-locking" receptacle.

Thus, a need exists for an electrical receptacle locking solution that does not significantly impact the overall footprint and spatial requirements of the electrical receptacle. Furthermore, a need exists for an electrical receptacle locking solution where the receptacle can be populated with a locking feature without the receptacle needing to be removed or uninstalled. These, and other needs, are addressed by one or more aspects of the present invention.

SUMMARY OF THE PRESENT INVENTION

Some exemplary embodiments of the present invention may overcome one or more of the above disadvantages and other disadvantages not described above, but the present invention is not required to overcome any particular disadvantage described above, and some exemplary embodiments of the present invention may not overcome any of the disadvantages described above.

Broadly defined, the present invention according to one aspect includes an electrical receptacle unit with locking feature. The electrical receptacle unit includes a receptacle adapted to be electrically connected to a source of electricity. The receptacle includes a socket and a plate disposed at a front of the socket. The electrical receptacle unit further includes a locking bracket positioned relative to the plate. The locking bracket is configured to be transitionable between an unlocked configuration, whereby a plug electrically seated within the socket is unobstructed by the locking bracket, and a locked configuration, whereby the plug electrically seated within the socket is obstructed by the locking bracket.

In a feature of this aspect, the locking bracket includes a generally flat central portion having a lock tab extending therefrom, and, in the locked configuration, the lock tab obstructs a portion of the plug so that the plug cannot be removed from the socket.

In another feature of this aspect, the lock tab extends from the central portion at an angle.

In another feature of this aspect, the locking bracket includes a support arm at each side of the central portion.

In another feature of this aspect, a distal end of each support arm is received within a corresponding notched area of the plate. In another feature of this aspect, a length of the locking bracket does not extend beyond a footprint of the receptacle in the stacking direction.

In another feature of this aspect, each support arm is secured to the plate via a hinge pin. In another feature of this aspect, the locking bracket is pivotable between the unlocked and locked configurations about the hinge pins.

In another feature of this aspect, the locking bracket further includes a pair of deflectable positioning arms extending away from the central portion. In another feature of this aspect, each positioning arm includes a bent portion that engages the plate at a respective side thereof. In another feature of this aspect: in the unlocked configuration, each bent portion is received within a respective first transverse groove arranged on the plate; in the locked configuration, each bent portion is received within a respective second transverse groove arranged on the plate; and the second transverse groove is spaced apart from the first transverse groove. In another feature of this aspect, the locking bracket is transitionable between the unlocked and locked configurations by laterally sliding the locking bracket so that the bent portions of the positioning arms move from the first transverse groove to the second transverse groove.

In another feature of this aspect, the locking bracket includes a grip tab extending from a side of the central portion opposite to that of the lock tab.

In another feature of this aspect, the locking bracket is made from a thin metal material.

In another feature of this aspect, the locking bracket includes at least one spring anchored to the plate that biases the locking bracket in favor of the locked configuration.

In another feature of this aspect, the plate includes a cavity adapted to receive a protrusion of the locking bracket when in the locked configuration.

Broadly defined, the present invention according to another aspect includes an electrical receptacle unit with locking feature. The electrical receptacle unit includes a receptacle adapted to be electrically connected to a source of electricity. The receptacle includes a socket and a plate disposed at a front of the socket. The electrical receptacle unit further includes a locking bracket that is pivotably secured at opposite sides of the plate and biased in favor of a locked position, whereby a lock tab obstructs a portion of the plug so that the plug cannot be removed from the socket.

In a feature of this aspect, the lock tab extends from a central portion of the locking bracket at an angle. In another feature of this aspect, the locking bracket includes a support arm at each side of the central portion, each support arm including an inwardly-oriented protrusion. In another feature of this aspect, the locking bracket is biased in favor of the locked position via one or more springs. In another feature of this aspect, each of the one or more springs is anchored between one of the support arms and the plate. In another feature of this aspect, a distal end of each support arm is received within a corresponding notched area of the plate. In another feature of this aspect, each support arm includes an inwardly-oriented protrusion that is received within a cavity of the corresponding notched area of the plate when the locking bracket is in the locked position. In another feature of this aspect, each protrusion is received within the cavity via snap-fit. In another feature of this aspect, a length of the locking bracket does not extend beyond a footprint of the receptacle in the stacking direction.

In another feature of this aspect, the locking bracket is pivotably secured to the plate via one or more hinge pins.

Broadly defined, the present invention according to another aspect includes an electrical receptacle unit with locking feature substantially as shown and described.

Broadly defined, the present invention according to another aspect includes a method of securing a plug to an electrical receptacle unit. The method includes providing a receptacle including a socket, a plate disposed at a front of the socket, and a locking bracket positioned relative to the plate; seating a plug within the socket; and transitioning the locking bracket from an unlocked configuration, whereby the plug is unobstructed by the locking bracket, and a locked configuration, whereby the plug is obstructed by the locking bracket.

In a feature of this aspect, the transitioning step includes pivoting the locking bracket about one or more hinge pins so that a lock tab extending from the locking bracket obstructs a ledge on the plug.

In another feature of this aspect, the transitioning step includes laterally sliding the locking bracket so that a lock tab extending from the locking bracket obstructs a ledge on the plug.

In another feature of this aspect, a length of the locking bracket does not extend beyond a footprint of the receptacle in the stacking direction.

In another feature of this aspect, the locking bracket is a spring-biased locking bracket.

Broadly defined, the present invention according to another aspect includes a method of securing a plug to an electrical receptacle unit substantially as shown and described.

Broadly defined, the present invention according to another aspect includes an electrical receptacle unit with locking feature. The electrical receptacle unit with locking feature includes a receptacle adapted to be electrically connected to a source of electricity. The receptacle includes an electrical fitting having electrical contacts contained therein and/or extending therefrom, a socket surrounding the electrical fitting, and a plate disposed at a front of the socket. The electrical receptacle unit with locking feature further includes a locking bracket that includes a central portion having first and second ends, a lock tab extending from a side of the central portion, and a pair of support arms, each extending forwardly from a respective one of the first and second ends. The locking bracket is pivotably secured to the plate, with at least a portion of each support arm positioned within a respective notched area of the plate. The locking bracket is pivotable relative to the plate between a first position, whereby a plug electrically seated within the socket is unobstructed, and a second position, whereby the plug electrically seated within the socket is obstructed from removal by the lock tab.

In a feature of this aspect, the receptacle is a panel-mount receptacle. In another feature of this aspect, the socket of the receptacle includes walls, at least one of which walls includes a locking tab that retains the receptacle in a fixture.

In another feature of this aspect, the electrical fitting is a female electrical fitting having female electrical contacts contained therein. In another feature of this aspect, the plug and receptacle are of a C13/C14-type. In another feature of this aspect, the locking bracket includes a grip tab extending from a side of the central portion opposite to that of the lock tab. In another feature of this aspect, the locking bracket is made from a metal material. In another feature of this aspect, a length of the locking bracket does not extend beyond a footprint of the receptacle in the stacking direction. In another feature of this aspect, the lock tab extends from the central portion at an angle.

In another feature of this aspect, each of the pair of support arms is secured to the plate via a respective hinge pin, each of which extends from a respective one of the notched areas of the plate and through an aperture of the portion of the support arm positioned therein. In another feature of this aspect, the locking bracket is pivotable between the first and second positions about the hinge pins.

In another feature of this aspect, the locking bracket further includes at least one spring anchored between one of the pair of support arms and the plate. In another feature of this aspect, the at least one spring biases the locking bracket in favor of the second position. In another feature of this aspect, each support arm includes an inwardly-oriented protrusion. In another feature of this aspect, each inwardly-oriented protrusion is received within a cavity of the corresponding notched area of the plate when the locking bracket is in the second position. In another feature of this aspect, each inwardly-oriented protrusion is received within the corresponding cavity via snap-fit.

Broadly defined, the present invention according to another aspect includes a method of securing a plug to an electrical receptacle unit. The method includes providing an electrical receptacle unit having a female electrical fitting with a surrounding receptacle unit socket, a plate disposed at a front of the receptacle unit socket, and a locking bracket having first and second support arms arranged to extend forwardly from opposite sides of a central portion, wherein the locking bracket is pivotably secured to the plate via one or more hinge pins, wherein at least a portion of each support arm is received within a respective notched area of the plate. The method further includes providing a plug having a male electrical fitting with male electrical contacts extending therefrom and a plug socket that surrounds the male electrical contacts, positioning the plug within the receptacle unit socket to establish an electrical connection therewith, and pivoting the locking bracket relative to the plate from a first position, whereby the plug is unobstructed, to a second position, whereby a portion of the locking bracket obstructs the plug from removal.

In a feature of this aspect, the plug includes a ledge formed at a junction of the male electrical fitting and the plug socket, and, when the locking bracket is pivoted from the first position to the second position, a lock tab extending forwardly from the central portion of the locking bracket is positioned over the ledge to obstruct the plug.

In another feature of this aspect, the locking bracket further includes at least one spring anchored between one of the pair of support arms and the plate, and the at least one spring biases the locking bracket in favor of the second position.

In another feature of this aspect, each support arm includes an inwardly-oriented protrusion, each notched area of the plate includes a cavity, and, when the locking bracket is pivoted from the first position to the second position, each inwardly-oriented protrusion is received, via snap-fit, within the corresponding cavity of the plate.

In another feature of this aspect, a length of the locking bracket does not extend beyond a footprint of the electrical receptacle unit in the stacking direction.

Broadly defined, the present invention according to another aspect includes an electrical receptacle unit with locking feature. The electrical receptacle unit with locking feature includes a receptacle adapted to be electrically connected to a source of electricity. The receptacle includes an electrical fitting having electrical contacts contained therein and/or extending therefrom, a socket surrounding the electrical fitting, and a plate disposed at a front of the socket. The electrical receptacle unit with locking feature further includes a locking bracket that includes a central portion having first and second ends, a lock tab extending forwardly from a side of the central portion, and a pair of support arms, each extending forwardly from a respective one of the first and second ends. The locking bracket is slidably engaged with the plate, with at least a portion of each support arm positioned within a respective notched area of the plate. The locking bracket is laterally maneuverable relative to the plate between a first position, whereby a plug electrically seated within the socket is unobstructed, and a second position, whereby the plug electrically seated within the socket is obstructed from removal by the lock tab.

In a feature of this aspect, the receptacle is a panel-mount receptacle. In another feature of this aspect, the socket of the receptacle includes walls, at least one of which walls includes a locking tab that retains the receptacle in a fixture.

In another feature of this aspect, the electrical fitting is a female electrical fitting having female electrical contacts contained therein. In another feature of this aspect, the plug and receptacle are of a C13/C14-type.

In another feature of this aspect, an inwardly-oriented hook tab is disposed at a distal end of each support arm and is received within the corresponding notched area of the plate. In another feature of this aspect, each inwardly-oriented hook tab is maneuverable from one end of the corresponding notched area to an opposite end of the corresponding notched area as the locking bracket is transitioned from the first position to the second position.

In another feature of this aspect, the locking bracket includes a grip tab extending from a side of the central portion opposite to that of the lock tab. In another feature of this aspect, the locking bracket is made from a metal material. In another feature of this aspect, a length of the locking bracket does not extend beyond a footprint of the receptacle in the stacking direction.

In another feature of this aspect, the locking bracket further includes a pair of deflectable positioning arms, each extending forwardly from the central portion at a location that is generally adjacent to, but spaced inwardly from, a respective one of the pair of support arms. In another feature of this aspect, each deflectable positioning arm includes a bent portion that engages a front-facing surface of the plate.

In another feature of this aspect, when the locking bracket is in the first position, each bent portion is seated within a respective one of a first aligned pair of transverse grooves in the front-facing surface of the plate, when the locking bracket is in the second position, each bent portion is seated within a respective one of a second aligned pair of transverse grooves in the front-facing surface of the plate, and the second aligned pair of transverse grooves is spaced apart from the first aligned pair of transverse grooves.

Broadly defined, the present invention according to another aspect includes a method of securing a plug to an electrical receptacle unit. The method includes providing an electrical receptacle unit having a female electrical fitting with a surrounding receptacle unit socket, a plate disposed at a front of the receptacle unit socket, and a locking bracket having first and second support arms arranged to extend forwardly from opposite sides of a central portion, wherein the locking bracket is slidably engaged with the plate, with at least a portion of each support arm received within a respective notched area of the plate. The method further includes providing a plug having a male electrical fitting with male electrical contacts extending therefrom and a plug socket that surrounds the male electrical contacts, positioning the plug within the receptacle unit socket to establish an electrical connection therewith, and laterally maneuvering the locking bracket relative to the plate from a first position, whereby the plug is unobstructed, to a second position, whereby a portion of the locking bracket obstructs the plug from removal.

In a feature of this aspect, the plug includes a ledge formed at a junction of the male electrical fitting and the plug socket, and, when the locking bracket is laterally maneuvered from the first position to the second position, a lock tab extending forwardly from the central portion of the locking bracket is positioned over the ledge to obstruct the plug.

In another feature of this aspect, the locking bracket includes a pair of deflectable positioning arms, each of the pair of deflectable positioning arms extends forwardly from the central portion at a location that is generally adjacent to, but spaced inwardly from, a respective one of the pair of support arms, and each of the pair of deflectable positioning arms includes a bent portion that engages a front-facing surface of the plate.

In another feature of this aspect, when the locking bracket is in the first position, the bent portion of each of the pair of positioning arms is seated within a respective one of a first aligned pair of transverse grooves in the front-facing surface of the plate, when the locking bracket is laterally maneuvered from the first position to the second position, each of the pair of deflectable positioning arms is deflected by the plate, and each of the bent portions is transitioned from the respective one of the first aligned pair of transverse grooves to a respective one of a second aligned pair of transverse grooves in the front-facing surface of the plate, and the second aligned pair of transverse grooves is spaced apart from the first aligned pair of transverse grooves.

In another feature of this aspect, laterally maneuvering the locking bracket from the first position to the second position includes applying a force to the locking bracket that is sufficient to cause each of the pair of deflectable positioning arms to be deflected.

In another feature of this aspect, a length of the locking bracket does not extend beyond a footprint of the electrical receptacle unit in the stacking direction.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

Further features, embodiments, and advantages of the present invention will become apparent from the following detailed description with reference to the drawings, wherein.

DETAILED DESCRIPTION

Figure 1A:
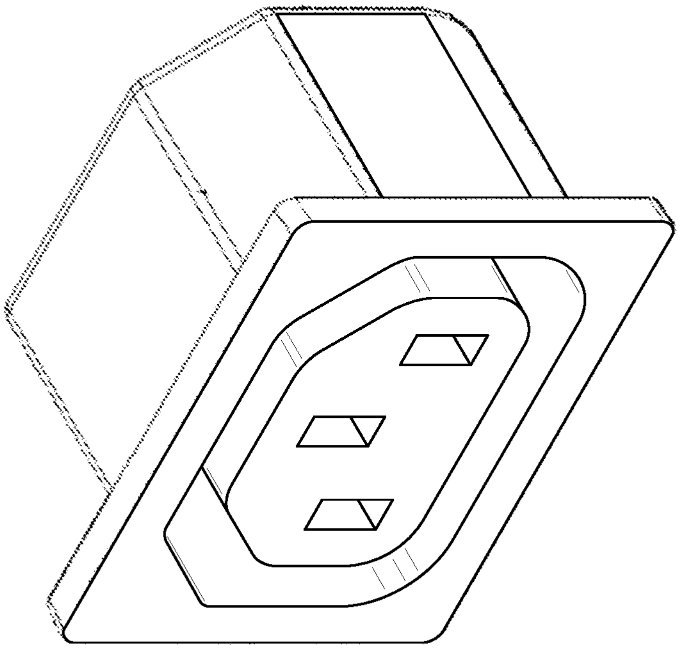
FIG. 1A is a front isometric view of a conventional female electrical receptacle.
Figure 1B:
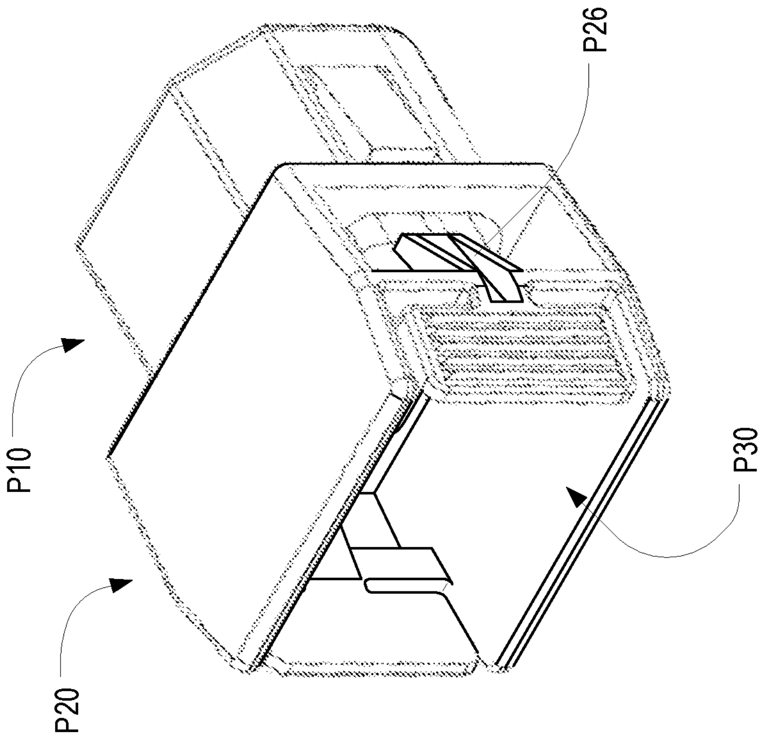
FIG. 1B is a front isometric view of a known electrical receptacle unit with an integrated locking feature.

As a preliminary matter, it will readily be understood by one having ordinary skill in the relevant art ("Ordinary Artisan") that the present invention has broad utility and application. Furthermore, any embodiment discussed and identified as being "preferred" is considered to be part of a best mode contemplated for carrying out the present invention. Other embodiments also may be discussed for additional illustrative purposes in providing a full and enabling disclosure of the present invention. As should be understood, any embodiment may incorporate only one or a plurality of the above-disclosed aspects of the invention and may further incorporate only one or a plurality of the above-disclosed features. Moreover, many embodiments, such as adaptations, variations, modifications, and equivalent arrangements, will be implicitly disclosed by the embodiments described herein and fall within the scope of the present invention.

Accordingly, while the present invention is described herein in detail in relation to one or more embodiments, it is to be understood that this disclosure is illustrative and exemplary of the present invention, and is made merely for the purposes of providing a full and enabling disclosure of the present invention. The detailed disclosure herein of one or more embodiments is not intended, nor is to be construed, to limit the scope of patent protection afforded the present invention, which scope is to be defined by the claims and the equivalents thereof. It is not intended that the scope of patent protection afforded the present invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection afforded the present invention is to be defined by the appended claims rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

Regarding applicability of 35 U.S.C. § 112, ¶6, no claim element is intended to be read in accordance with this statutory provision unless the explicit phrase "means for" or "step for" is actually used in such claim element, whereupon this statutory provision is intended to apply in the interpretation of such claim element.

Furthermore, it is important to note that, as used herein, "a" and "an" each generally denotes "at least one," but does not exclude a plurality unless the contextual use dictates otherwise. Thus, reference to "a picnic basket having an apple" describes "a picnic basket having at least one apple" as well as "a picnic basket having apples." In contrast, reference to "a picnic basket having a single apple" describes "a picnic basket having only one apple."

When used herein to join a list of items, "or" denotes "at least one of the items," but does not exclude a plurality of items of the list. Thus, reference to "a picnic basket having cheese or crackers" describes "a picnic basket having cheese without crackers," "a picnic basket having crackers without cheese," and "a picnic basket having both cheese and crackers." Finally, when used herein to join a list of items, "and" denotes "all of the items of the list." Thus, reference to "a picnic basket having cheese and crackers" describes "a picnic basket having cheese, wherein the picnic basket further has crackers," as well as describes "a picnic basket having crackers, wherein the picnic basket further has cheese."

Referring now to the drawings, in which like numerals represent like components throughout the several views, one or more preferred embodiments of the present invention are next described. The following description of one or more preferred embodiment(s) is merely exemplary in nature and is in no way intended to limit the invention, its application, or uses.

Figure 2:
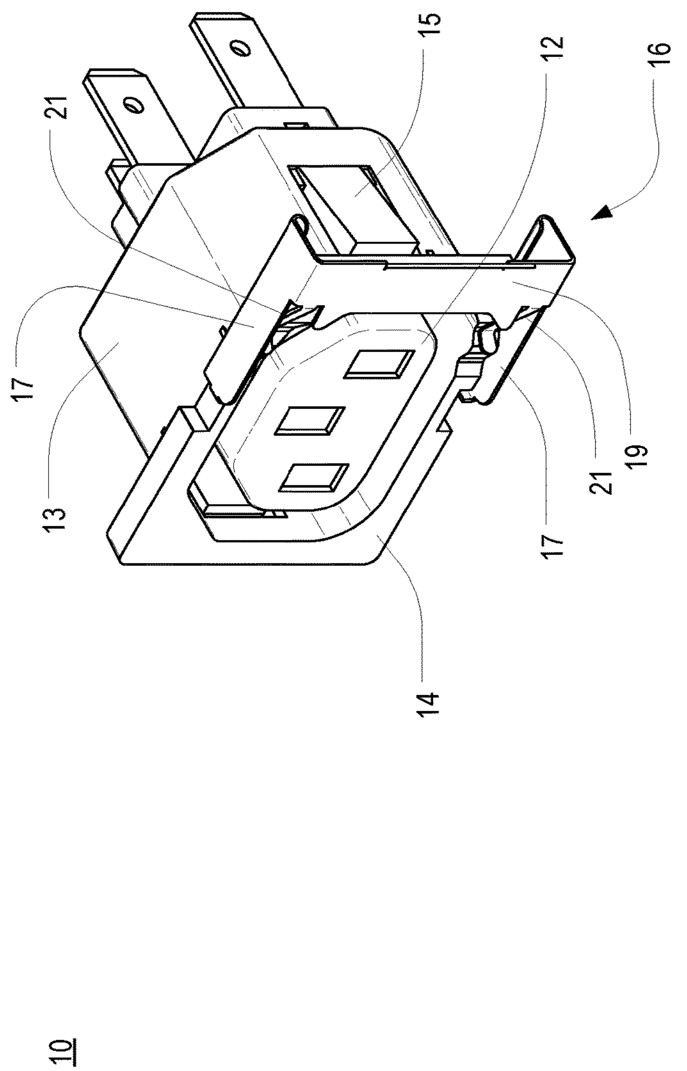
FIG. 2 is a front isometric view of an electrical receptacle unit with locking feature in accordance with a preferred embodiment of the present invention.

FIG. 2 is a front isometric view of an electrical receptacle unit 10 with locking feature in accordance with a preferred embodiment of the present invention. As shown therein, the electrical receptacle unit 10 includes a female electrical fitting 12, a surrounding socket 13, and a plate 14 disposed at a front of the surrounding socket 13. The illustrated female fitting 12 is in the form of a panel-mount C13-type receptacle, but it will be appreciated that various other receptacle types with different electrical connection configurations also exist. In at least some embodiments, the plate 14 is integral with the socket 13, but, in other embodiments, the plate 14 may be attached during or after manufacturing. Further, in some contemplated embodiments, the plate is integral with, or attached to, the electrical fitting.

Figure 3:
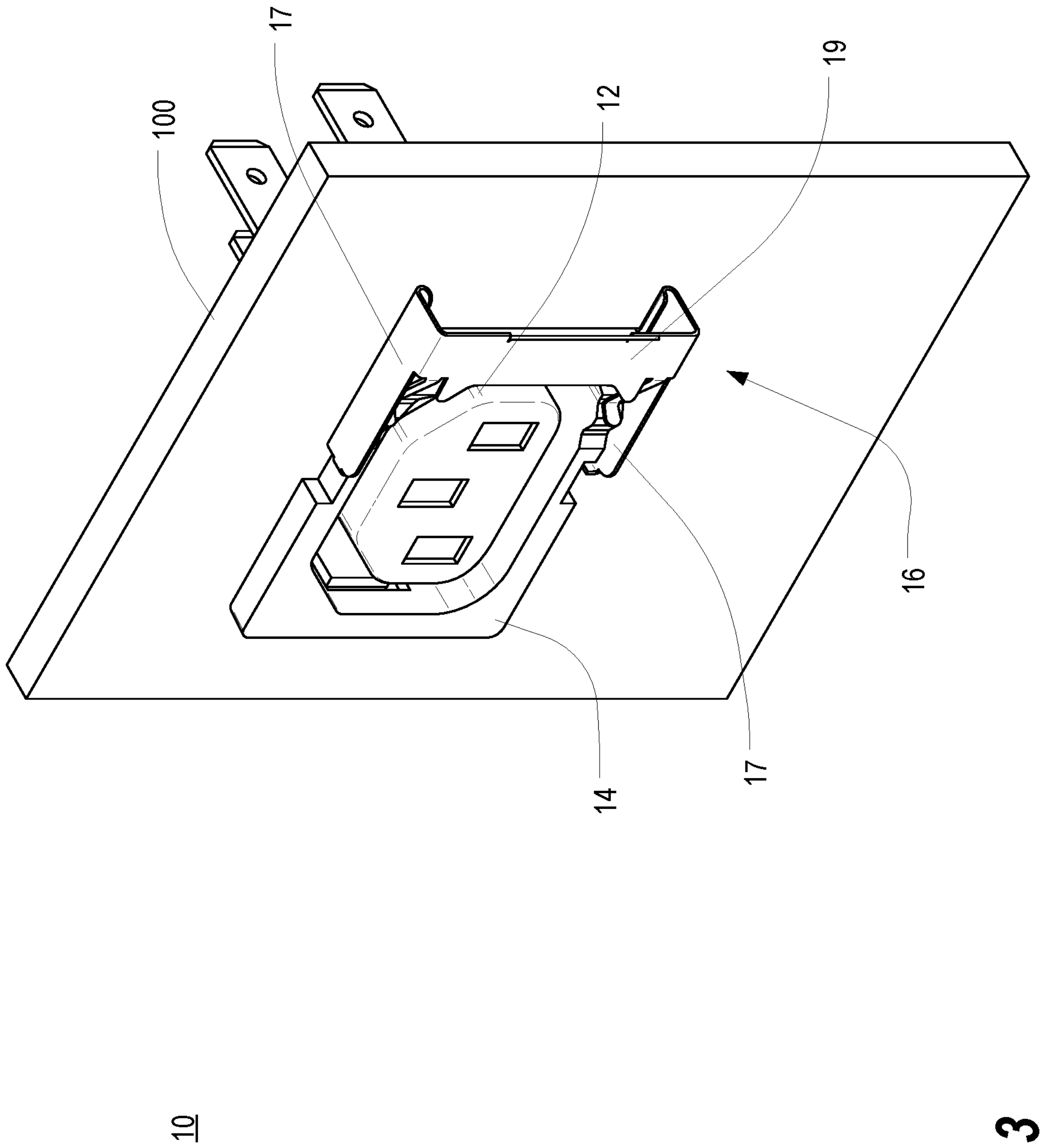
FIG. 3 is a front isometric view of the electrical receptacle unit of FIG. 2 shown mounted in a fixture, wherein the fixture is illustrated schematically.

FIG. 3 is a front isometric view of the electrical receptacle unit of FIG. 2 shown mounted in a fixture 100, wherein the fixture 100 is illustrated schematically. The receptacle unit 10 may be mounted in various fixtures using screws, solder joints, or in other known ways; the receptacle (and especially the socket) may include additional features to facilitate such mounting. In accordance with one or more preferred approaches to mounting the receptacle unit 10, the walls of the socket 13 may include locking tabs 15 (as can be seen in FIG. 2) that are naturally depressed as the socket 13 is maneuvered into position in the fixture 100, but are biased to spring outward when the socket 13 is fully inserted into such fixture 100, thereby holding the receptacle unit 10 in place in the fixture 100.

As can be seen in FIGS. 2 and 3, the electrical receptacle unit 10 further includes a locking bracket 16 that is slidably engaged with the plate 14. The locking bracket includes a flat central portion 19 with a pair of support arms 17 arranged at opposite sides that extend toward and fit against sides of the plate 14. As will be explained in greater detail below, the locking bracket 14 is capable of being maneuvered laterally toward the plate 14 to secure, or lock, a plug that is received in the electrical receptacle unit 10.

In at least some embodiments, the locking bracket 16 is manufactured separately from the electrical receptacle unit 10 and is fastened thereto. It is further contemplated that the locking bracket 16 can be pre-installed or can be installed on the receptacle unit 10 after the receptacle unit 10 has been put into use. In this latter regard, the support arms 17 need only be deflected far enough away from one another to be fit at either side of the plate 14. It is contemplated that deflection of the support arms 17 can be accomplished with the aid of a flat head screwdriver, which can be used as a lever against one of the support arms 17. The locking bracket 16 can likewise be uninstalled from the receptacle unit 10 in a similar manner without the receptacle unit 10 needing to be removed or uninstalled. In at least some embodiments, it is contemplated that the locking bracket 16 is made from a durable solid material, such as a hardened thin metal material, that is capable of deflection and exhibits a resilient quality.

Figure 4:
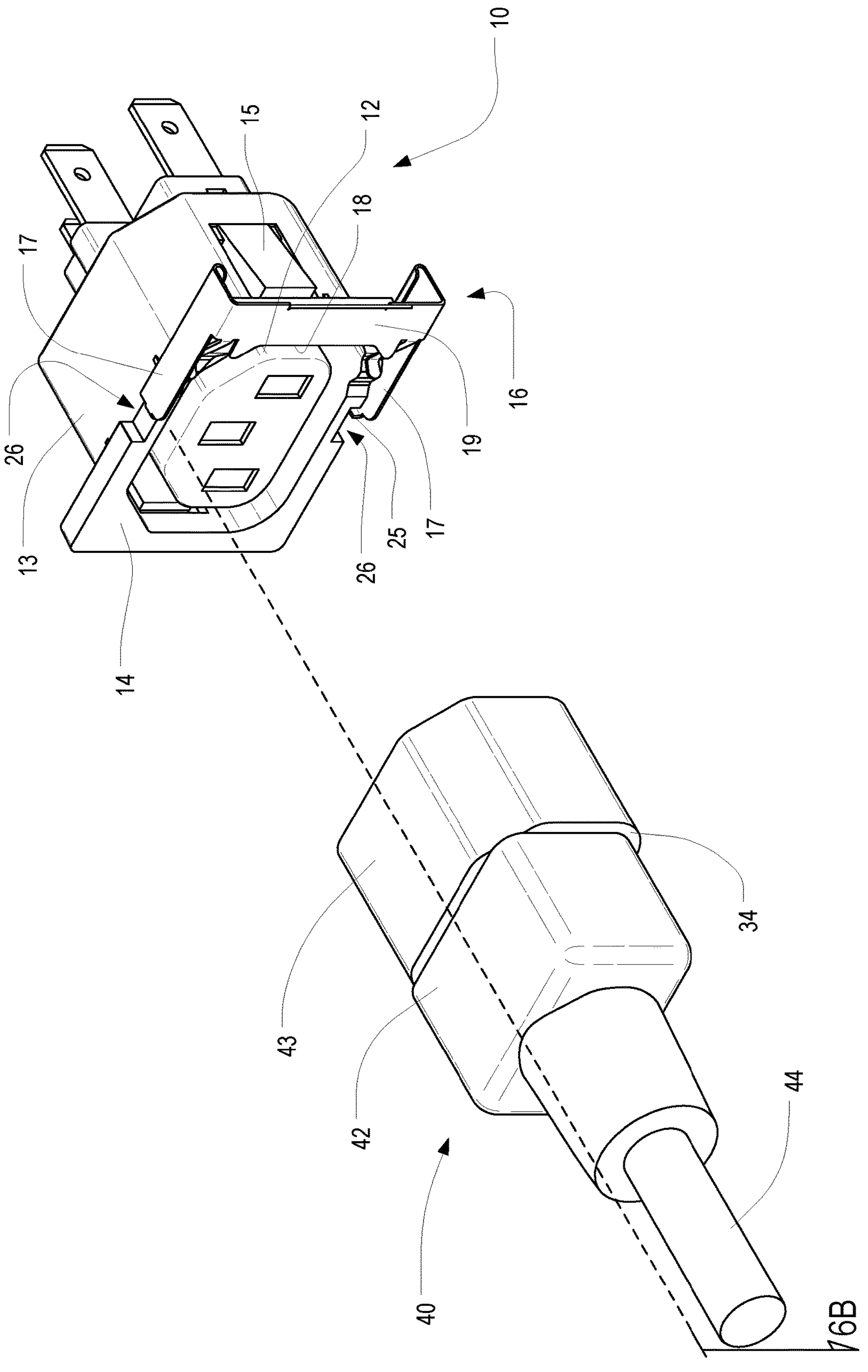
FIG. 4 is a front isometric view of the electrical receptacle unit of FIG. 2, shown with an unconnected power cord.

The female electrical fitting 12 is adapted to receive a corresponding male electrical fitting. In this regard, FIG. 4 is a front isometric view of the electrical receptacle unit 10 of FIG. 2, shown with an unconnected power cord. The power cord includes a plug 40 attached to the end of an electrical cable 44. The plug 40 includes a male fitting 42, from which male electrical contacts extend as well as a socket 43 surrounding the male electrical contacts. A ledge 34 is formed at the junction of the male fitting 42 and the socket 43, where trailing edges of the socket 43 extend beyond leading edges of the male fitting 42 (as the plug 40 is received in the receptacle unit 10). In at least some embodiments, the plug 40 is of conventional construction, as is the electrical cable 44 to which it is attached.

Figure 5A:
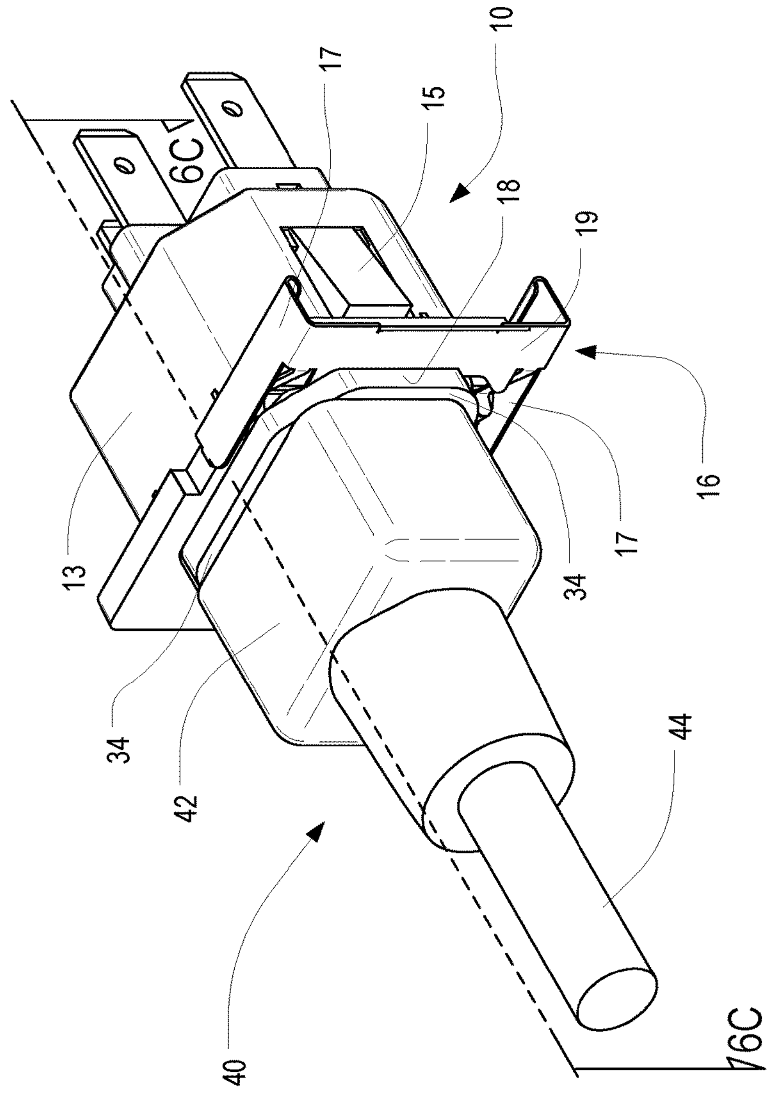
FIG. 5A is a front isometric view of the electrical receptacle unit of FIG. 2, shown with the power cord connected thereto in an unlocked position.
Figure 5B:
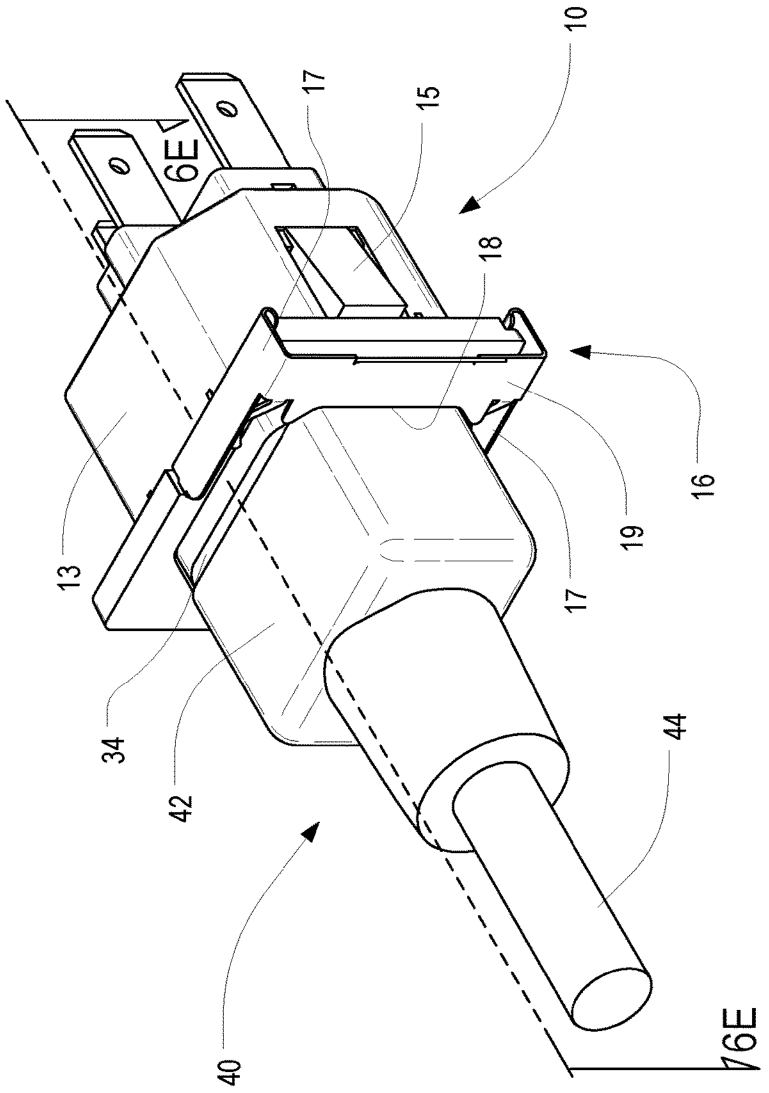
FIG. 5B is a front isometric view of the electrical receptacle unit of FIG. 2, shown with the power cord connected thereto in a locked position.

The plug 40 may be inserted into the receptacle unit 10 such that a conventional electrical connection is established and maintained. In this regard, FIG. 5A is a front isometric view of the electrical receptacle unit 10 of FIG. 2, shown with the power cord connected thereto in an unlocked position, and FIG. 5B is a front isometric view of the electrical receptacle unit 10 of FIG. 2, shown with the power cord connected thereto in a locked position. When fully seated in the socket 13, the plug 40 can be retained by shifting the locking bracket 16 toward the plate 14 so that an inward-facing lock tab 18 (extending inwardly from the central portion 19 of the locking bracket 16) rests over the ledge 34 formed at the junction of the male fitting 42 and the plug socket 43. In so doing, the lock tab 18 obstructs the plug 40 such that it will not become "unplugged" or otherwise disconnected accidentally from the socket 13, thereby effectively locking the plug 40 into position.

FIGS. 6A-6F are a series of top views of the electrical receptacle unit 10 and plug 40 of FIGS. 4, 5A and 5B that illustrate locking and unlocking the locking bracket 16 relative to the plug 40. In FIGS. 6A-6F, solid arrows are sometimes used to illustrate movement of various components of the locking bracket 16, whether by an applied force or by reaction to an applied force.

Figure 6A:
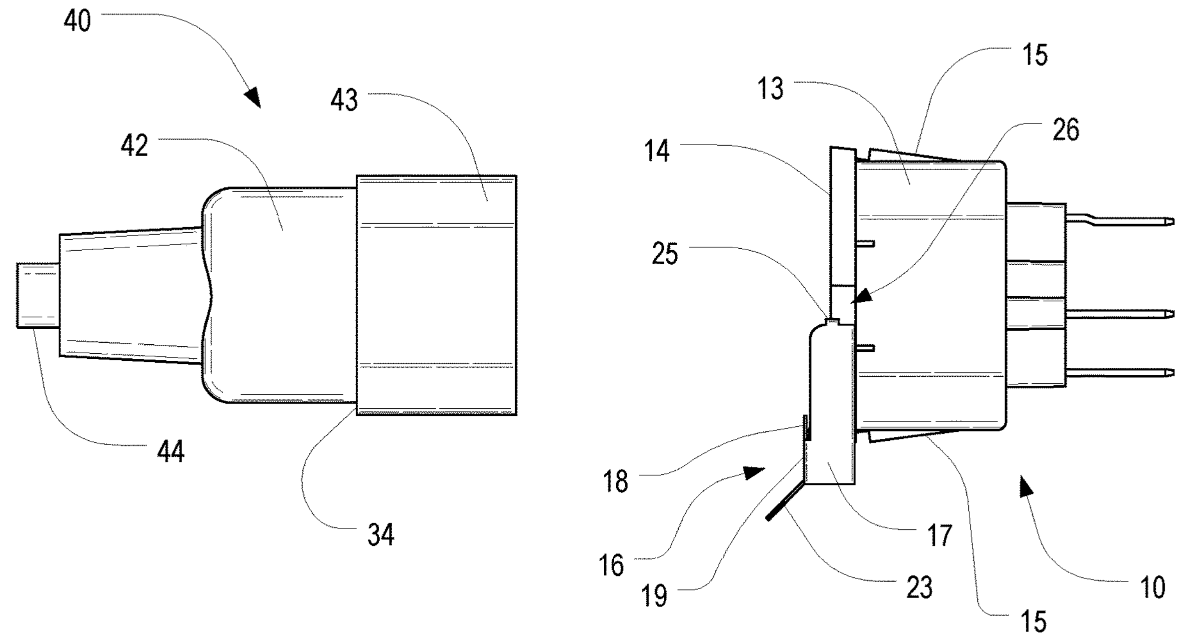
FIG. 6A is a top view of the electrical receptacle unit and plug of FIG. 4.
Figure 6B:
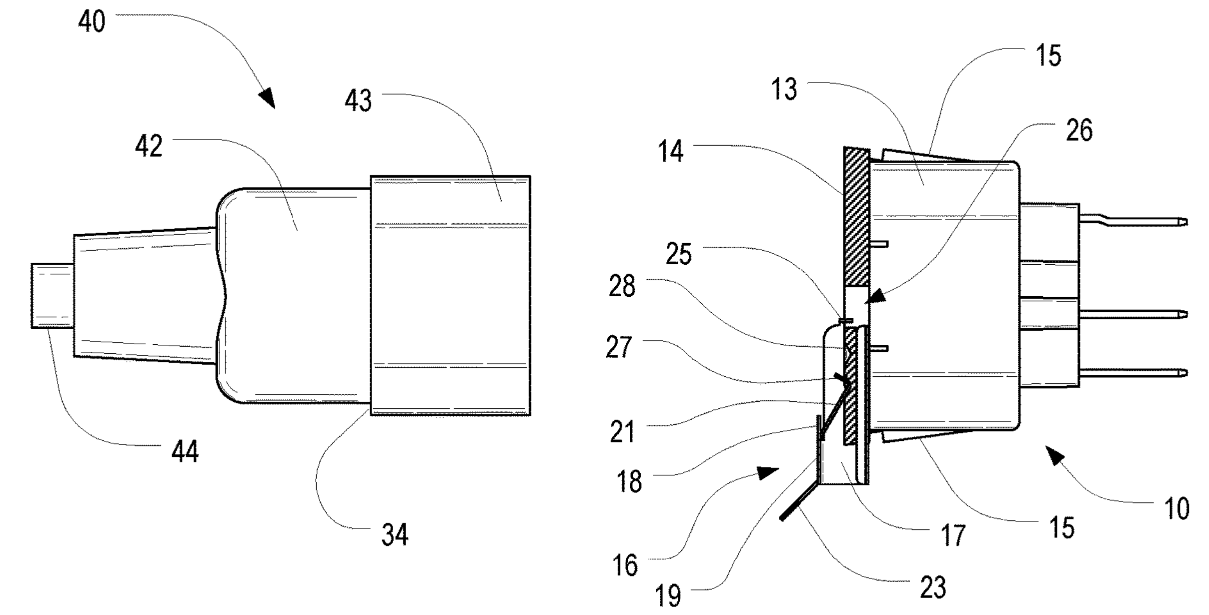
FIG. 6B is a top cross-sectional view of the electrical receptacle unit and plug of FIG. 4, taken along line 6B-6B.

FIG. 6A is a top view of the electrical receptacle unit 10 and plug 40 of FIG. 4, and FIG. 6B is a top cross-sectional view of the electrical receptacle unit 10 and plug 40 of FIG. 4, taken along line 6B-6B. In FIGS. 6A and 6B, the locking bracket 16 is arranged in the unlocked position so that the plug 40 can be received in the socket 13 of the electrical receptacle unit 10. With additional reference to FIG. 4, the support arms 17 of the locking bracket 16 are arranged against the plate 14 of the receptacle unit 10 along lateral edges thereof. Each support arm 17 includes a hook tab 25 at a distal end. The hook tab 25 is received within a corresponding notched area 26 at opposed lateral edges of the plate 14. As the locking bracket 16 is transitioned to the locked position, the hook tabs 25 slide from one end of the respective notched area 26 to the opposite end. In either the unlocked or locked position, it is contemplated that the hook tabs 25 remain within the respective notched areas 26, thereby assisting with keeping the locking bracket 16 secure and/or aligned relative to the receptacle unit 10.

As further shown in FIGS. 6A and 6B, the locking bracket 16 further includes a grip tab 23 that extends outwardly and upwardly from a side of the central portion 19, opposite from the lock tab 18. The grip tab 23 provides a surface by which the locking bracket 16 can be grasped and maneuvered by a user, such as by holding the grip tab 23 between the user's thumb and forefinger. In this manner, the grip tab 23 facilitates a user having the ability to transition the locking bracket 16 manually between the unlocked and locked positions.

Figure 6C:
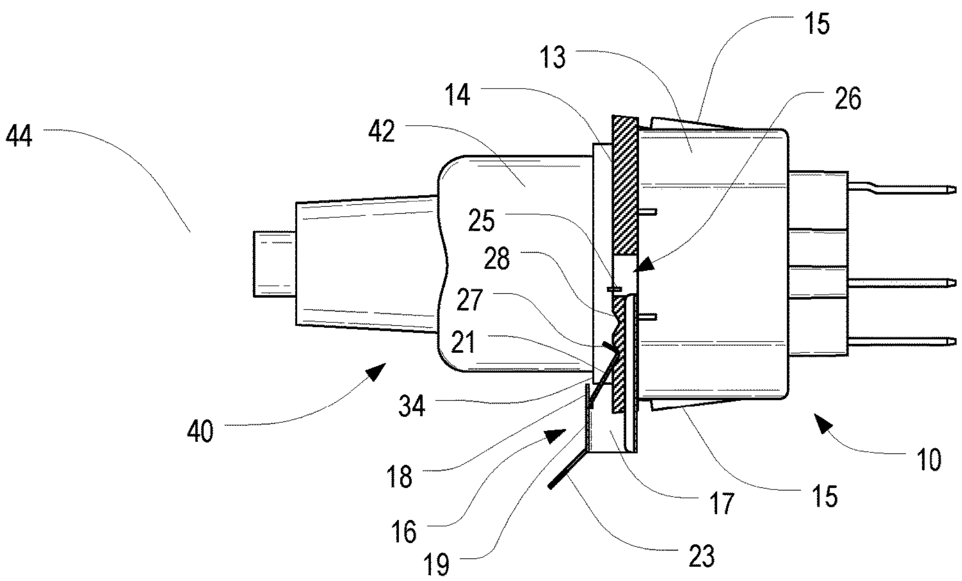
FIG. 6C is a top cross-sectional view of the electrical receptacle unit and plug of FIG. 5A, taken along line 6C-6C.
Figure 18A:
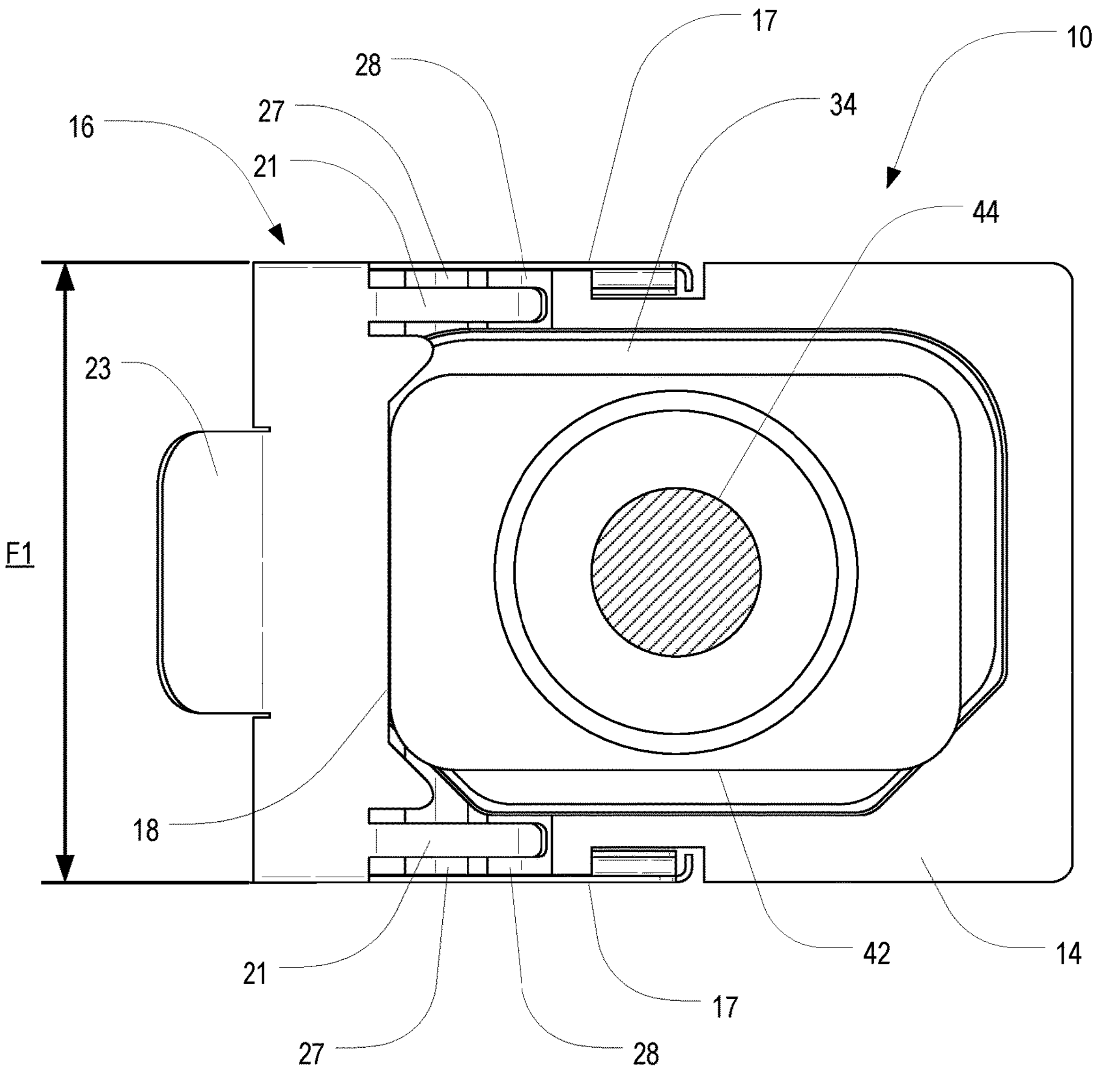
FIG. 18A is an end view of the electrical receptacle unit and plug of FIG. 5B, illustrating a footprint of the locking bracket in the stacking direction.

FIG. 6C is a top cross-sectional view of the electrical receptacle unit 10 and plug 40 of FIG. 5A, taken along line 6C-6C. With the plug 40 in alignment with the female electrical fitting 12 of the socket 13, the plug 40 can be received in the electrical receptacle unit 10 to establish an electrical connection therewith. In FIG. 6C, the locking bracket 16 remains in the unlocked position so that the plug 40 is not otherwise obstructed and can, thus, be disconnected from the socket 13 with a simple pulling force. With reference to FIGS. 2, 6C and 18A, the locking bracket 16 further includes a pair of positioning arms 21 that extend from the central portion 19 in the same direction as the lock tab 18. Each positioning arm 21 extends from the central portion 19 at a location that is generally adjacent to, but spaced inwardly from, a respective one of the support arms 17. As perhaps best seen in FIG. 6C, the positioning arms 21 are generally L-shaped. Additionally, each positioning arm 21 extends away from the central portion 19 at an angle such that the "corner" of the L-shape is the portion of the positioning arm 21 that is farthest away from a plane defined by the central portion 19 of the locking bracket 16.

Figure 6D:
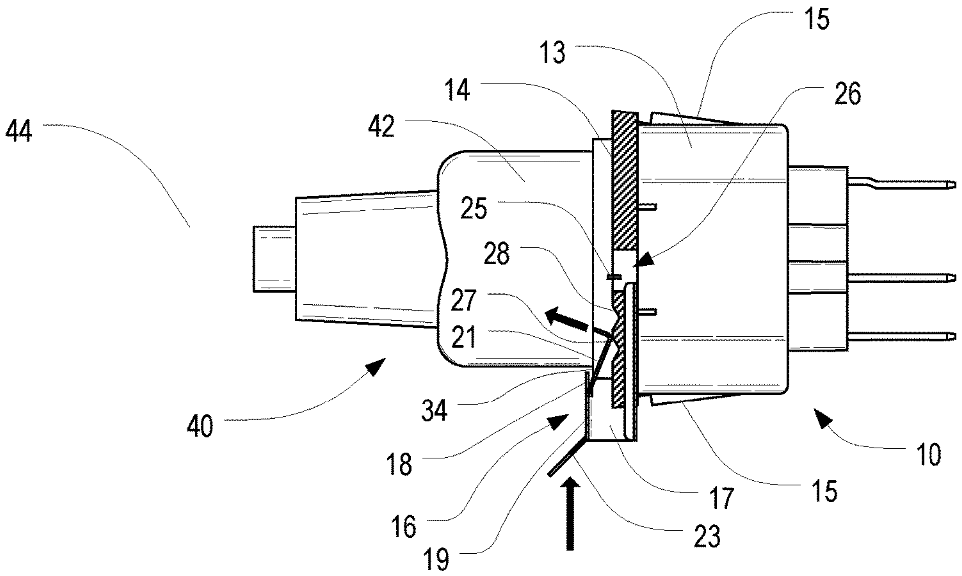
FIG. 6D is a top cross-sectional view of the electrical receptacle unit and plug of FIG. 6C, shown with the locking bracket being transitioned from the unlocked position to the locked position.
Figure 6E:
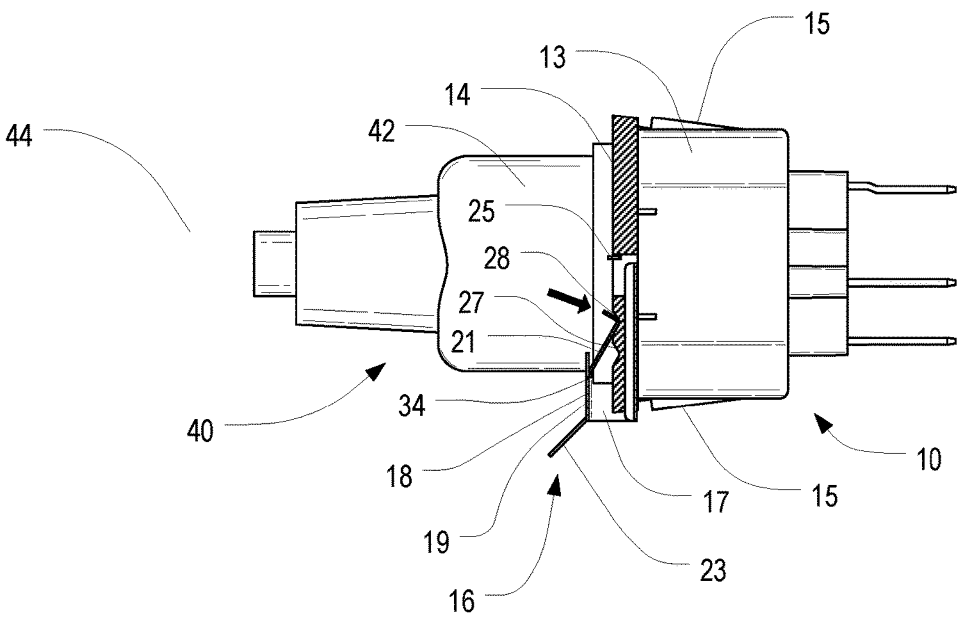
FIG. 6E is a top cross-sectional view of the electrical receptacle unit and plug of FIG. 5B, taken along line 6E-6E.

FIG. 6D is a top cross-sectional view of the electrical receptacle unit 10 and plug 40 of FIG. 6C, shown with the locking bracket 16 being transitioned from the unlocked position to the locked position, and FIG. 6E is a top cross-sectional view of the electrical receptacle unit 10 and plug 40 of FIG. 5B, taken along line 6E-6E. With the plug 40 seated in the socket 13, the plug 10 can be secured by maneuvering the locking bracket 16 from the unlocked position to the locked position. As can be seen in FIGS. 6D, 6E and 18A, the plate 14 of the electrical receptacle unit 10 includes two pairs of spaced-apart transverse grooves 27,28 disposed along the outwardly-facing surface thereof. More particularly, a pair of transverse grooves 27,28 is disposed at each side of the plate 10, with respective first transverse grooves 27 in alignment with one another and respective second transverse grooves 28 in alignment with one another.

When in the unlocked position, the positioning arms 21 of the locking bracket 16 are seated, in an undeflected state, within respective first transverse grooves 27 of the plate, as shown in FIG. 6C. To transition the locking bracket 16 to the locked position, a pushing force (represented by a first solid arrow in FIG. 6D) is applied to the grip tab 23. This applied force causes the positioning arms 21 of the locking bracket to push against the upwardly inclined portions of the respective first transverse grooves 27, which, in turn, cause the positioning arms 21 to be deflected toward the plug 40 (as shown by a second solid arrow in FIG. 6D).

Once the positioning arms 21 have been deflected sufficiently to clear the first transverse grooves 27 of the plate 14, the applied force causes the locking bracket 16 to shift inwardly toward the plug 40 until the positioning arms 21 reach the second transverse grooves 28. Here, the positioning arms 21 snap back to the undeflected state with each positioning arm 21 seated within a respective second transverse groove 28 of the plate 14 (as shown by a solid arrow in FIG. 6E). As the positioning arms 21 become seated in the second transverse grooves, the inward-facing lock tab 18 of the locking bracket 16 passes over the ledge 34 formed at the junction of the male fitting 42 and the plug socket 43. The lock tab 18 obstructs the plug 40 such that it will not become "unplugged" or otherwise disconnected accidentally from the socket 13, as can perhaps best be seen in FIG. 18A. With the positioning arms 21 seated in the second transverse grooves 28 and the lock tab 18 positioned over the ledge 34, the locking bracket 16 is now arranged in the locked position.

Figure 6F:
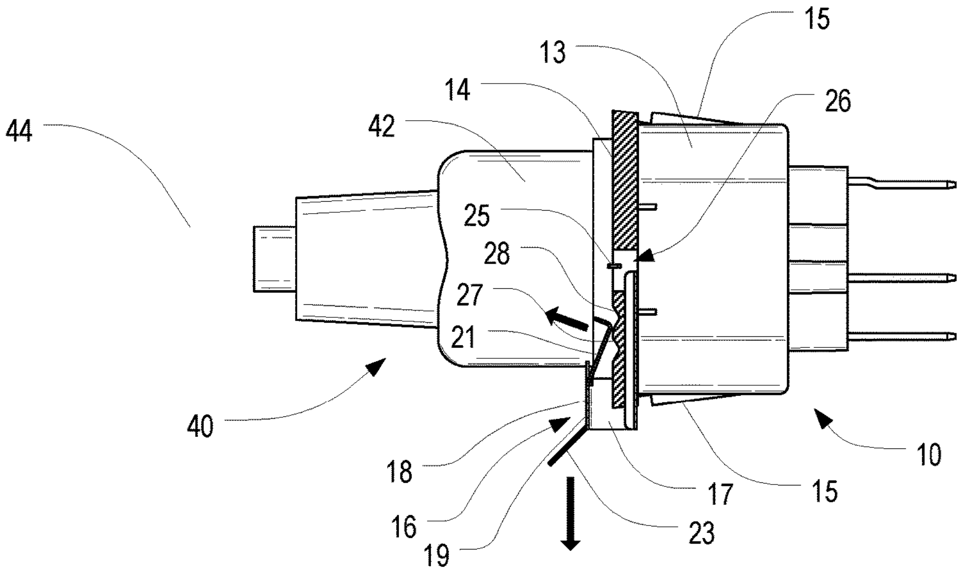
FIG. 6F is a top cross-sectional views of the electrical receptacle unit and plug of FIG. 6E, shown with the locking bracket being transitioned from the locked position to the unlocked position.

FIG. 6F is a top cross-sectional view of the electrical receptacle unit 10 and plug 40 of FIG. 6E, shown with the locking bracket 16 being transitioned from the locked position to the unlocked position. As shown in FIG. 6F, the locking bracket 16 can be returned to the unlocked position in a similar manner. A pulling force (represented by a first solid arrow in FIG. 6F) is applied to the grip tab 23. This applied force causes the positioning arms 21 of the locking bracket to push against the upwardly inclined portions of the respective second transverse grooves 28 (in the opposite direction than before), which, in turn, cause the positioning arms 21 to be deflected toward the plug 40 (as shown by a second solid arrow in FIG. 6F). Once the positioning arms 21 have been deflected sufficiently to clear the second transverse grooves 27 of the plate 14, the applied force causes the locking bracket 16 to shift outwardly away from the plug 40 until the positioning arms 21 reach the first transverse grooves 27. Here, the positioning arms 21 snap back to the undeflected state with each positioning arm 21 seated within a respective first transverse groove 27 of the plate 14. With the positioning arms 21 seated in the first transverse grooves 27, the lock tab 18 no longer obstructs the ledge 34, and the plug 40 is free to be removed from the socket 13.

Figure 7:
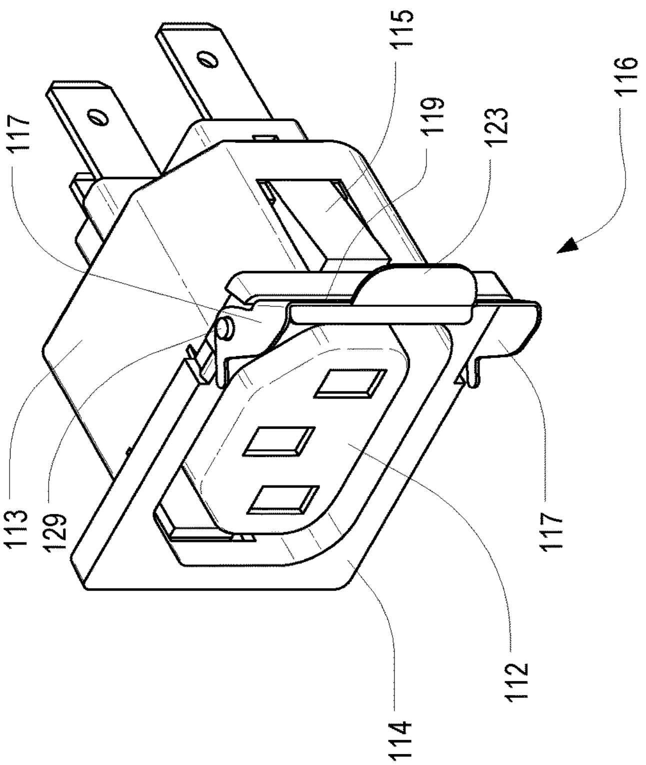
FIG. 7 is a front isometric view of another electrical receptacle unit with locking feature in accordance with a preferred embodiment of the present invention.

FIG. 7 is a front isometric view of another electrical receptacle unit 110 with locking feature in accordance with a preferred embodiment of the present invention. As shown therein, the electrical receptacle unit 110 includes a female electrical fitting 112, a surrounding socket 113, and a plate 114 disposed at a front of the surrounding socket 113. The illustrated female fitting 112 is in the form of a panel-mount C13-type receptacle, but it will be appreciated that various other receptacle types with different electrical connection configurations also exist. In at least some embodiments, the plate 114 is integral with the socket 113, but, in other embodiments, the plate 114 may be attached during or after manufacturing. Further, in some contemplated embodiments, the plate is integral with, or attached to, the electrical fitting.

Figure 8:
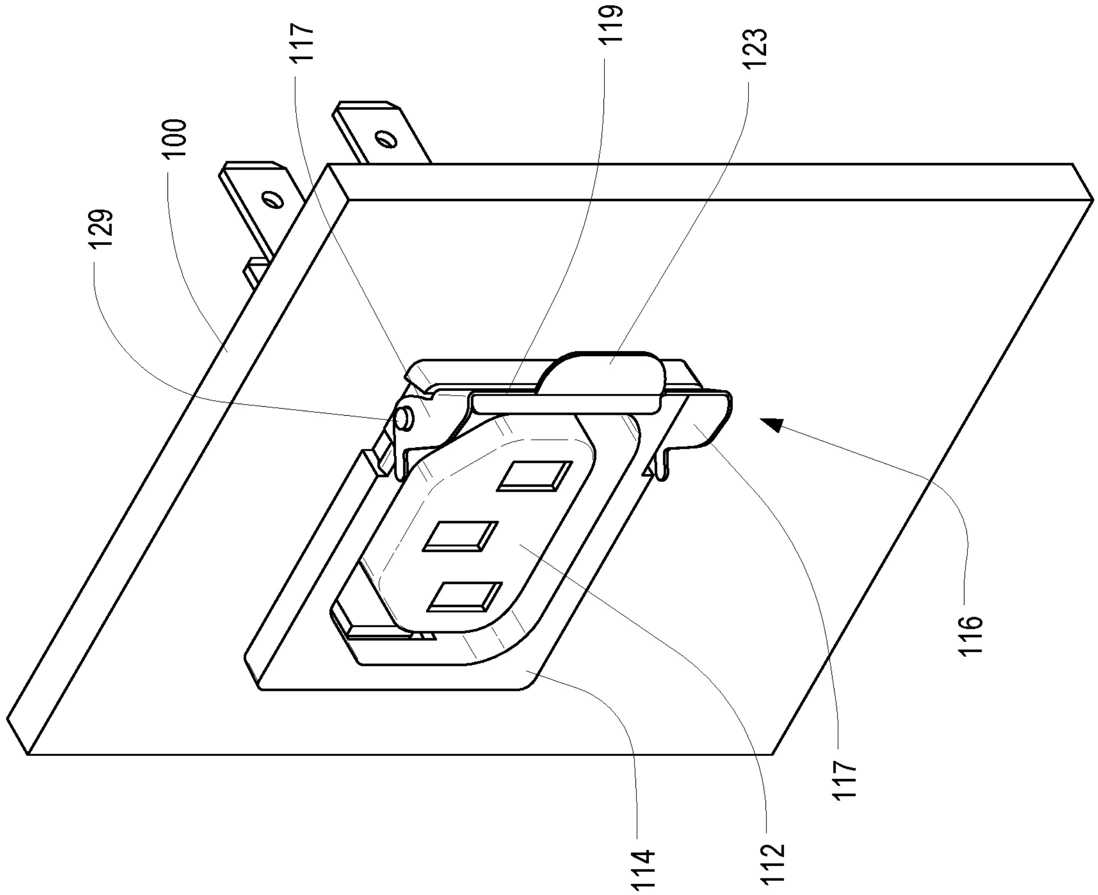
FIG. 8 is a front isometric view of the electrical receptacle unit of FIG. 7 shown mounted in a fixture, wherein the fixture is illustrated schematically.

FIG. 8 is a front isometric view of the electrical receptacle unit 110 of FIG. 7 shown mounted in a fixture 100, wherein the fixture 100 is illustrated schematically. The receptacle unit 110 may be mounted in various fixtures using screws, solder joints, or in other known ways; the receptacle (and especially the socket) may include additional features to facilitate such mounting. In accordance with one or more preferred approaches to mounting the receptacle unit 110, the walls of the socket 113 may include locking tabs 115 (as can be seen in FIG. 7) that are naturally depressed as the socket 113 is maneuvered into position in the fixture 100, but are biased to spring outward when the socket 113 is fully inserted into such fixture 100, thereby holding the receptacle unit 110 in place in the fixture 100.

Figure 18B:
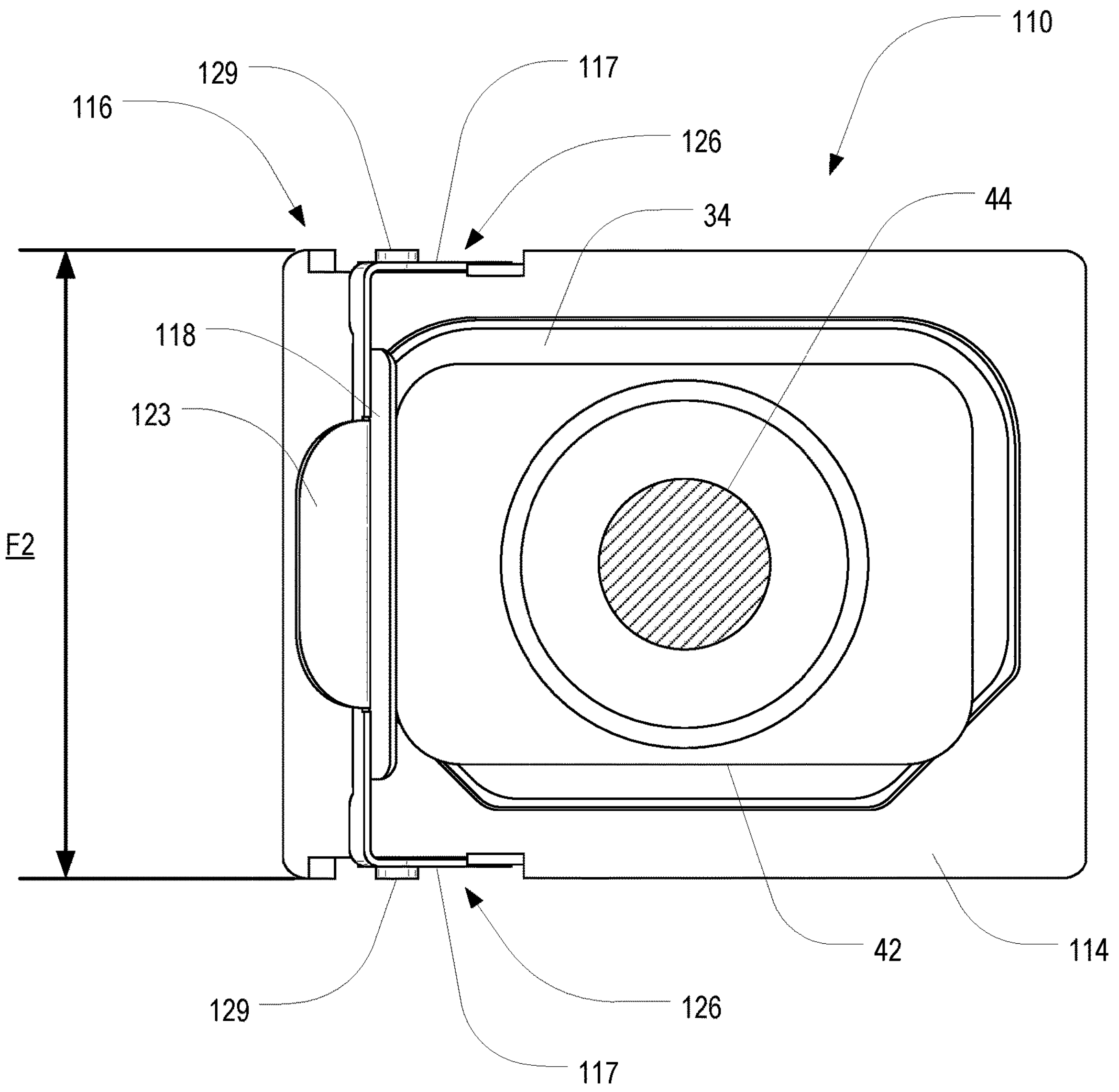
FIG. 18B is an end view of the electrical receptacle unit and plug of FIG. 10B, illustrating a footprint of the locking bracket in the stacking direction.

As can be seen in FIGS. 7, 8 and 18B, the electrical receptacle unit 110 further includes a locking bracket 116. The locking bracket 116 includes a flattened central portion 119 disposed between a pair of support arms 117. The support arms 117 extend toward sides of the plate 114 and are secured thereto via hinge pins 129. In a contemplated embodiment, the hinge pins 129 protrude outwardly away from the plate 114 and through corresponding apertures of the support arms 117. In this manner, the hinge pins 129 facilitate rotational movement of the locking bracket 116 relative to the plate 114 so that the locking bracket can be transitioned between unlocked and locked positions.

In at least some embodiments, the locking bracket 116 is manufactured separately from the electrical receptacle unit 110 and is fastened thereto. It is contemplated that the locking bracket 116 can be pre-installed or can be installed on the receptacle unit 110 after the receptacle unit 110 has been put into use. In this latter regard, the support arms 117 need only be deflected far enough away from one another to be fit at either side of the plate, with the hinge pins 129 received in corresponding apertures of the support arms 117. It is contemplated that deflection of the support arms 117 can be accomplished with the aid of a flat head screwdriver, which can be used as a lever against one of the support arms 117. The locking bracket 116 can likewise be uninstalled from the receptacle unit 110 in a similar manner without the receptacle unit 110 needing to be removed or uninstalled. In at least some embodiments, it is contemplated that the locking bracket 116 is made from a durable solid material, such as a hardened thin metal material.

Figure 9:
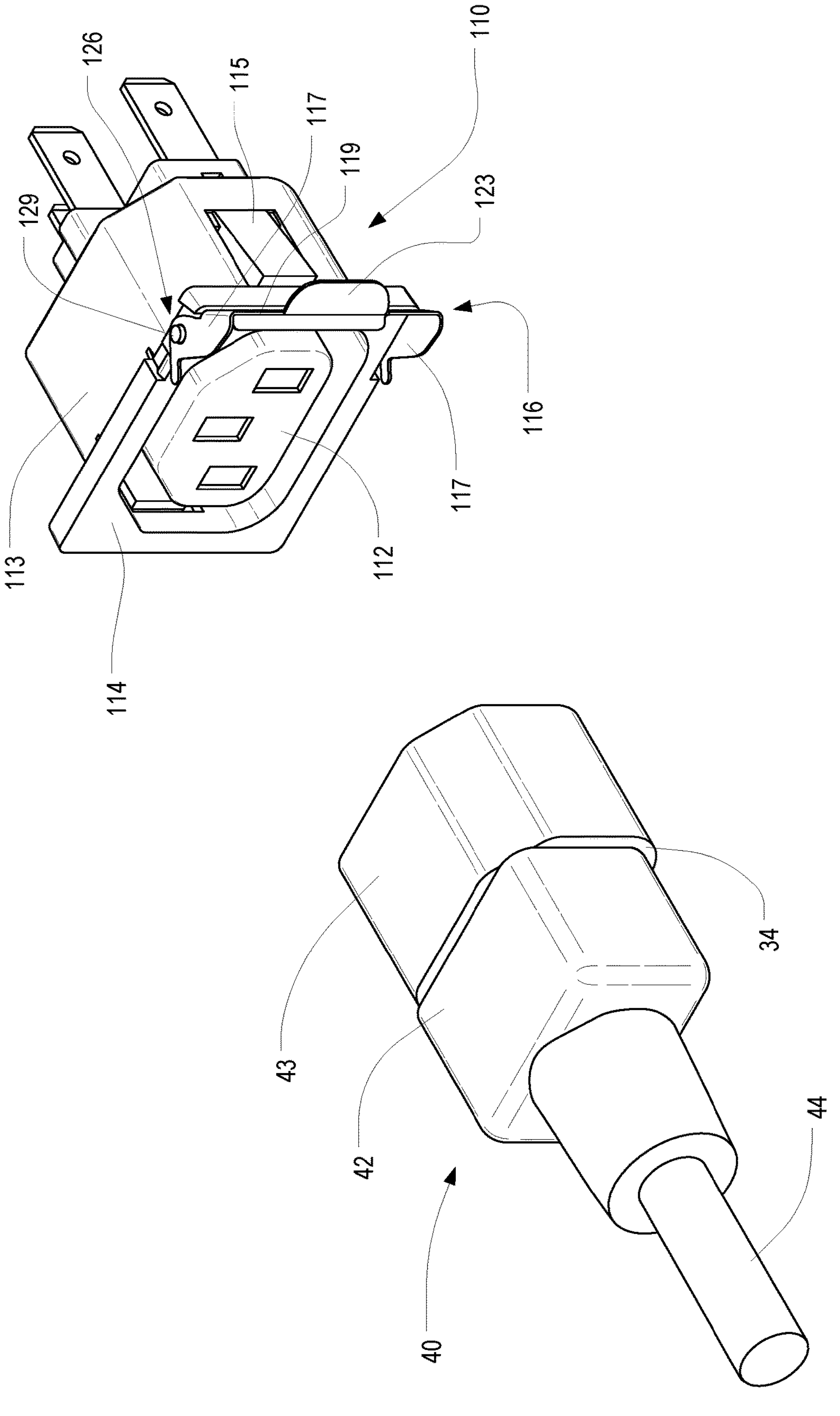
FIG. 9 is a front isometric view of the electrical receptacle unit of FIG. 7, shown with an unconnected power cord.

The female electrical fitting 112 is adapted to receive a corresponding male electrical fitting. In this regard, FIG. 9 is a front isometric view of the electrical receptacle unit 110 of FIG. 7, shown with an unconnected power cord. The power cord includes a plug 40 attached to the end of an electrical cable 44. The plug 40 includes a male fitting 42, from which male electrical contacts extend as well as a socket 43 surrounding the male electrical contacts. A ledge 34 is formed at the junction of the male fitting 42 and the socket 43, where trailing edges of the socket 43 extend beyond leading edges of the male fitting 42 (as the plug 40 is received in the receptacle unit 110). In at least some embodiments, the plug 40 is of conventional construction, as is the electrical cable 44 to which it is attached.

Figure 10A:
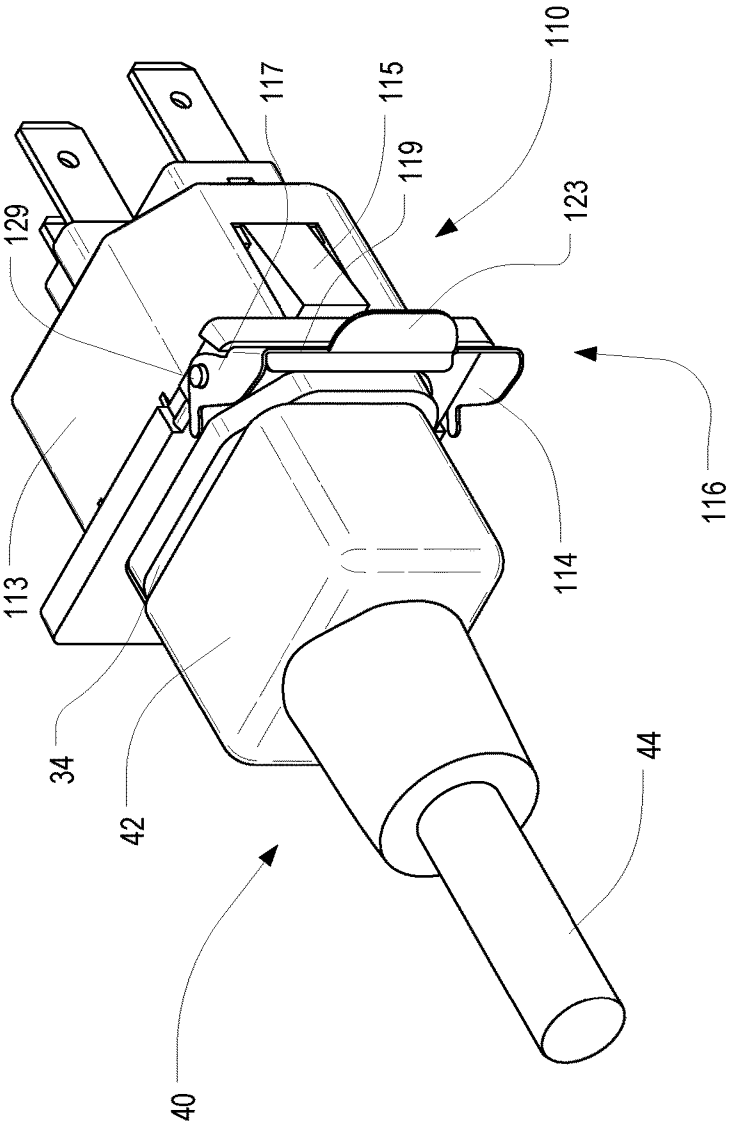
FIG. 10A is a front isometric view of the electrical receptacle unit of FIG. 7, shown with a power cord connected thereto in an unlocked position.
Figure 10B:
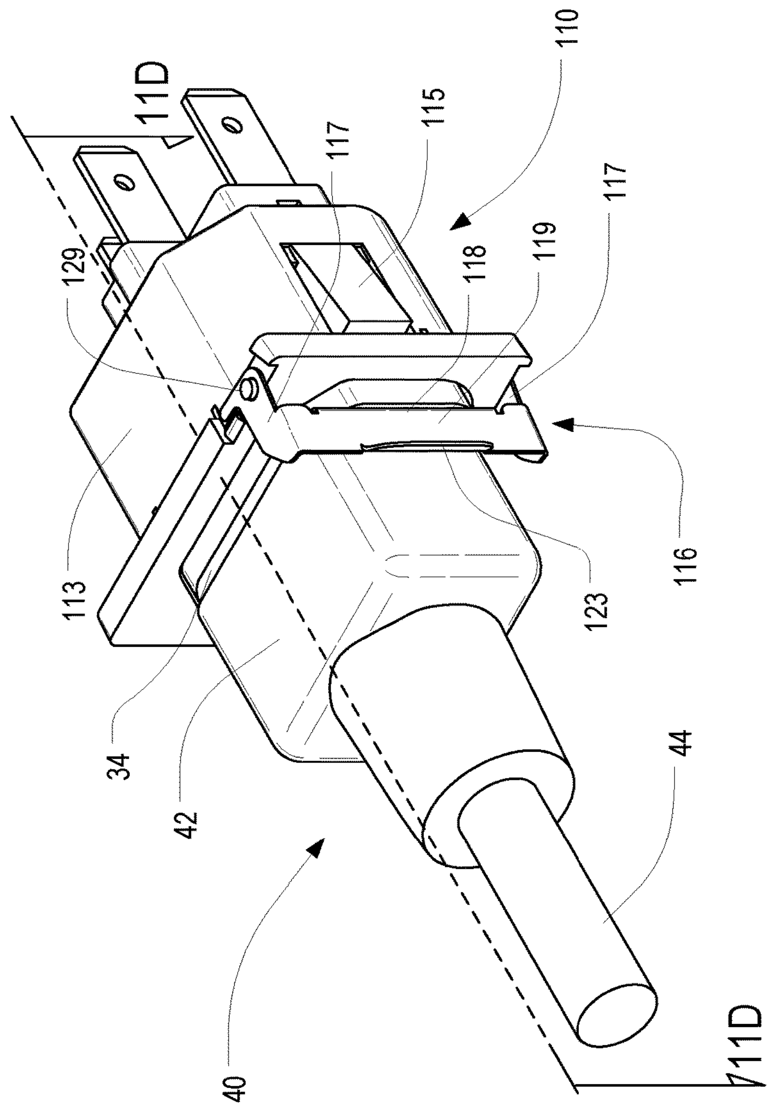
FIG. 10B is a front isometric view of the electrical receptacle unit of FIG. 7, shown with the power cord connected thereto in a locked position.

The plug 40 may be inserted into the receptacle unit 110 such that a conventional electrical connection is established and maintained. In this regard, FIG. 10A is a front isometric view of the electrical receptacle unit 110 of FIG. 7, shown with a power cord connected thereto in an unlocked position, and FIG. 10B is a front isometric view of the electrical receptacle unit 110 of FIG. 7, shown with the power cord connected thereto in a locked position. When fully seated in the socket 113, the plug 40 can be retained by pivoting the locking bracket 116 toward the plate 114 so that a lock tab 118 rests over the ledge 34 formed at the junction of the male fitting 42 and the plug socket 43. In so doing, the lock tab 118 obstructs the plug 40 such that it will not become "unplugged" or otherwise disconnected accidentally from the socket 113, thereby effectively locking the plug 40 into position. In a contemplated embodiment, the lock tab 118 extends, at an angle, from an inward-facing edge of the central portion 119 of the locking bracket 116 (as perhaps best seen in FIG. 11D).

FIGS. 11A-11D are a series of top views of the electrical receptacle unit 110 and plug 40 of FIGS. 9, 10A and 10B that illustrate locking and unlocking the locking bracket 116 relative to the plug 40. In FIGS. 11A-11D, solid arrows are sometimes used to illustrate movement of various components of the locking bracket 116.

Figure 11A:
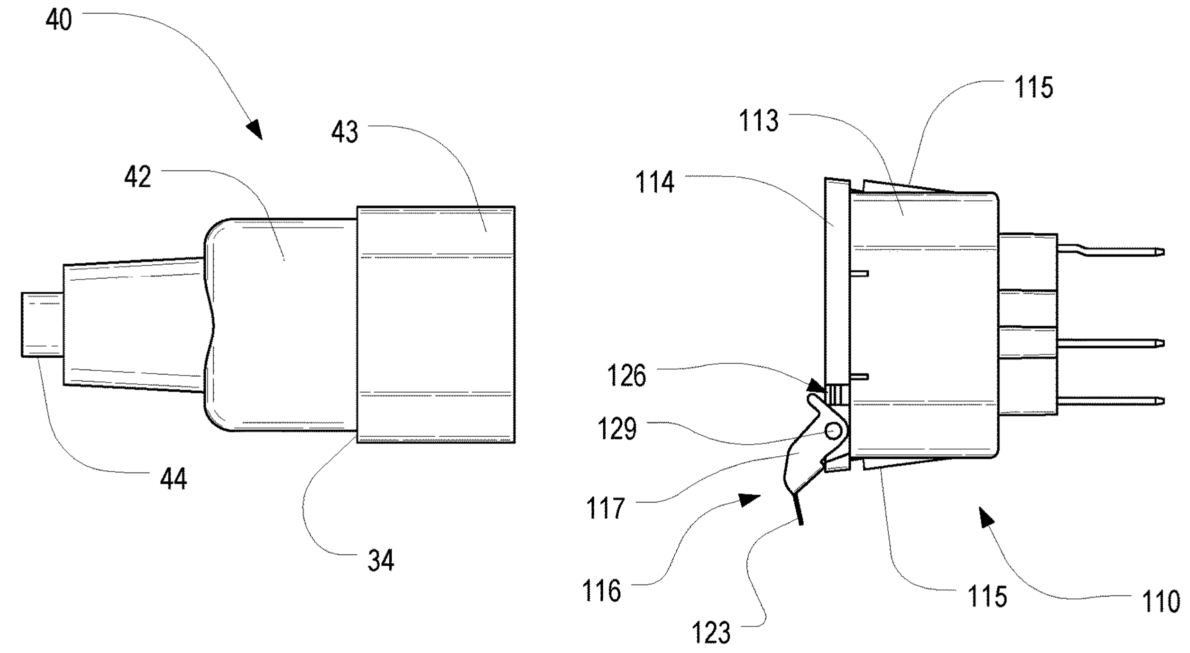
FIG. 11A is a top view of the electrical receptacle unit and plug of FIG. 9.

FIG. 11A is a top view of the electrical receptacle unit 110 and plug 40 of FIG. 9. In FIG. 11A, the locking bracket 116 is arranged in the unlocked position so that the plug 40 can be received in the socket 113 of the electrical receptacle unit 110. With additional reference to FIGS. 9 and 18B, distal ends of the support arms 117 are anchored to, and received within, notched areas 126 along opposed lateral edges of the plate 114. As the locking bracket 116 is pivoted about the hinge pins 129, distal ends of the support arms 117 remain within the notched areas 126, thereby assisting with keeping the locking bracket 116 aligned relative to the receptacle unit 110.

As further shown in FIG. 11A, the locking bracket 116 includes a grip tab 123 that extends outwardly and upwardly from a side of the central portion 119, opposite from the lock tab 118. The grip tab 123 provides a surface by which the locking bracket 116 can be grasped and maneuvered by a user, such as by holding the grip tab 123 between the user's thumb and forefinger. In this manner, the grip tab 123 facilitates a user having the ability to transition the locking bracket 116 manually between the unlocked and locked positions.

Figure 11B:
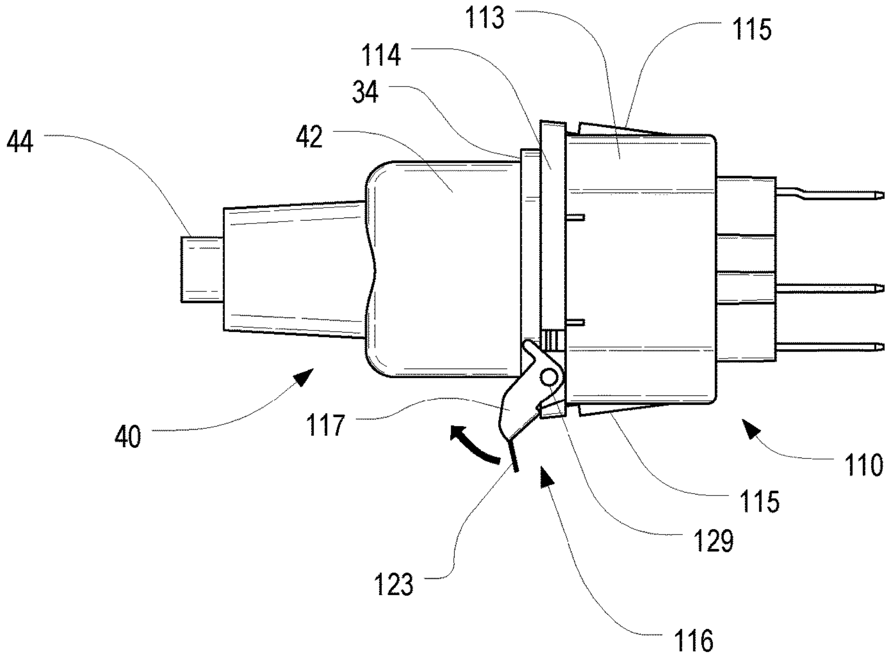
FIG. 11B is a top view of the electrical receptacle unit and plug of FIG. 10A.

FIG. 11B is a top view of the electrical receptacle unit 110 and plug 40 of FIG. 10A. With the plug 40 in alignment with the female electrical fitting 112 of the socket 113, the plug 40 can be received in the electrical receptacle unit 110 to establish an electrical connection therewith. In FIG. 11B, the locking bracket 116 remains in the unlocked position so that the plug 40 is not otherwise obstructed and can, thus, be disconnected from the socket 113 with a simple pulling force. To transition the locking bracket 116 from the unlocked position to the locked position, a rotational force is applied to the grip tab 123. This applied force causes the locking bracket 116 to pivot, about the hinge pins 129, toward the plug 40. The direction of rotation is represented by a solid arrow in FIG. 11B.

Figure 11C:
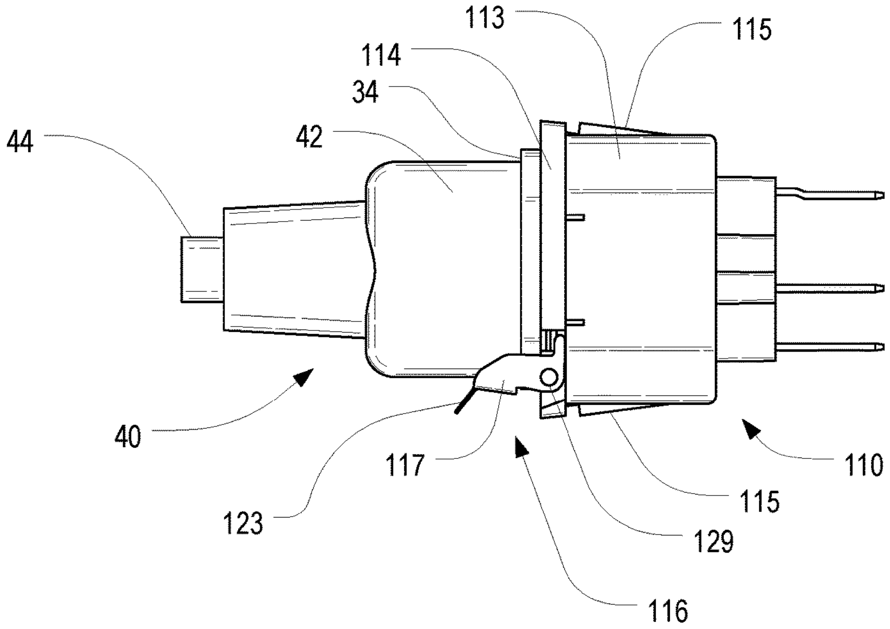
FIG. 11C is a top view of the electrical receptacle unit and plug of FIG. 10B.
Figure 11D:
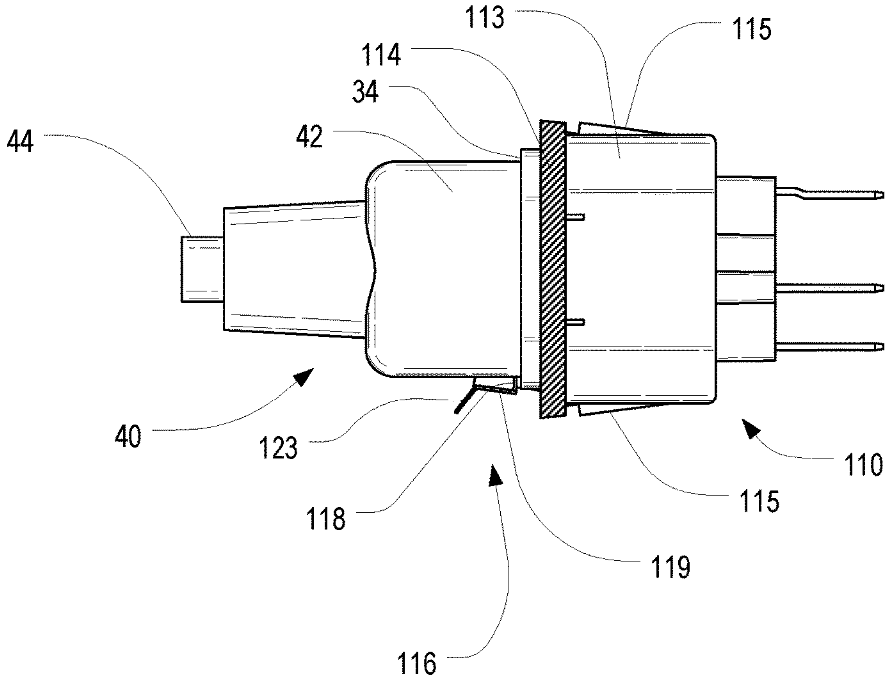
FIG. 11D is a top cross-sectional view of the electrical receptacle unit and plug of FIG. 10B, taken along line 11D-11D.

FIG. 11C is a top view of the electrical receptacle unit 110 and plug 40 of FIG. 10B; and FIG. 11D is a top cross-sectional view of the electrical receptacle unit 110 and plug 40 of FIG. 10B, taken along line 11D-11D. The lock tab 118 of the locking bracket 116 is pivoted toward the plug 40 until the lock tab 118 passes over the ledge 34 formed at the junction of the male fitting 42 and the plug socket 43. Once the lock tab 118 is positioned over the top of the ledge 34 formed at the junction of the male fitting 42 and the plug socket 43, the locking bracket 116 is in the locked position. As perhaps best seen in FIGS. 11D and 18B, the lock tab 118 obstructs the plug 40 such that it will not become "unplugged" or otherwise disconnected accidentally from the socket 113. Additionally, the hinge pins 129, which provide a pivot point for the locking bracket 116, are positioned such that a pulling force applied to the plug 40 does not cause the lock tab 118 to become disengaged. The locking bracket 116 can be transitioned from the locked position back to the unlocked position by pivoting the locking bracket 116 away from the plug 40 so that the lock tab 118 no longer obstructs the ledge 34.

Figure 12A:
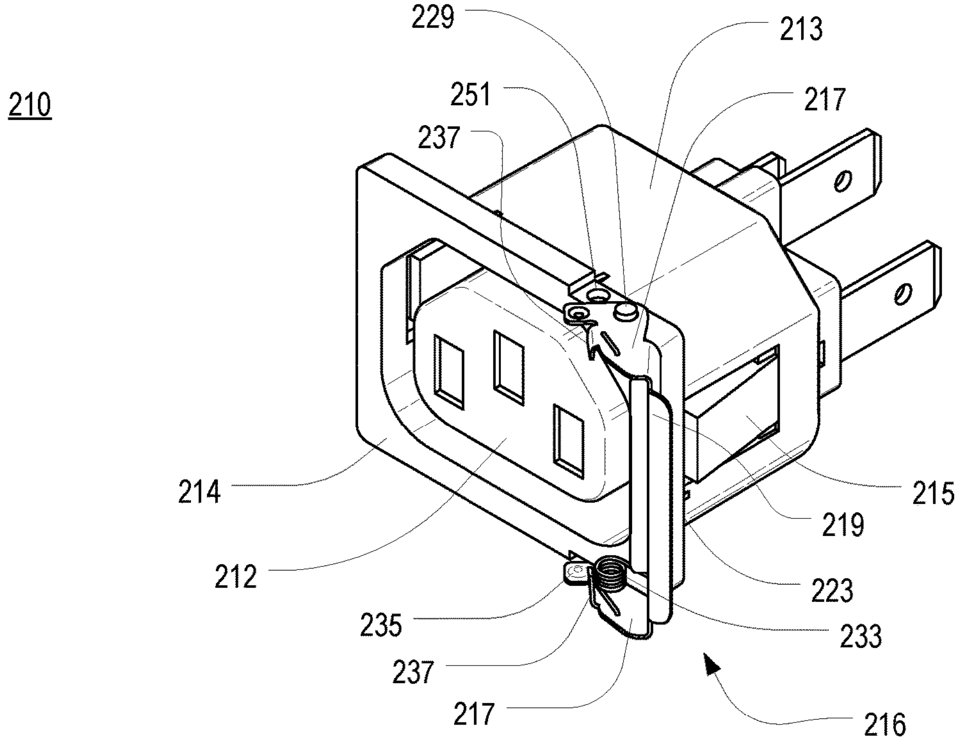
FIG. 12A is a front isometric view of another electrical receptacle unit with locking feature in accordance with a preferred embodiment of the present invention.
Figure 12B:
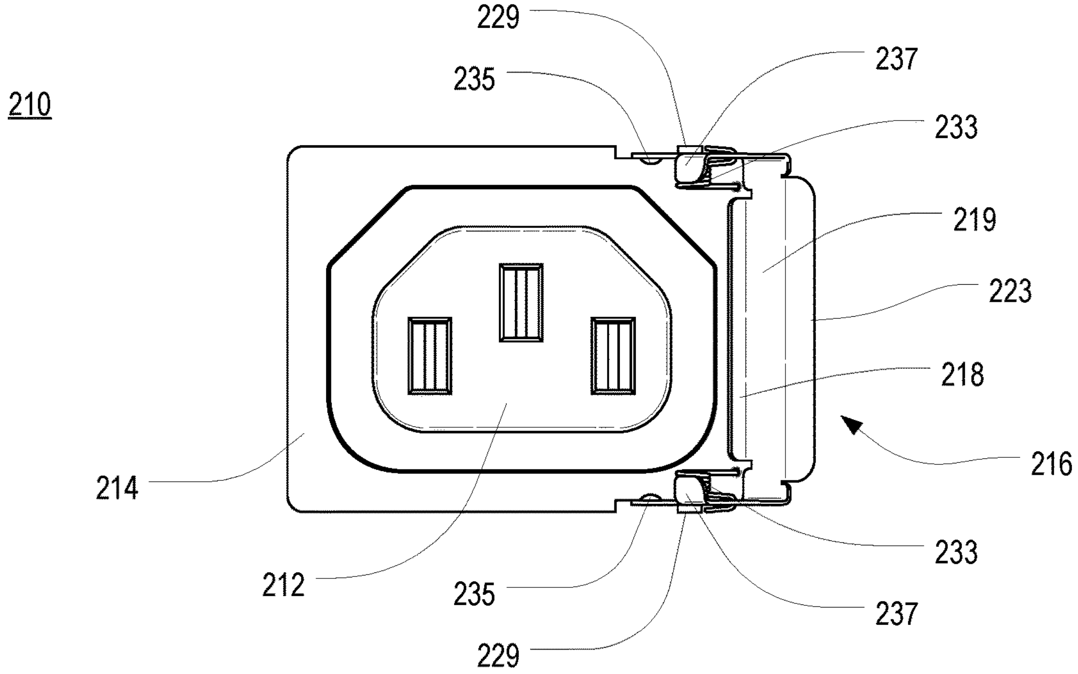
FIG. 12B is a front view of the electrical receptacle unit of FIG. 12A.

FIG. 12A is a front isometric view of another electrical receptacle unit 210 with locking feature in accordance with a preferred embodiment of the present invention, and FIG. 12B is a front view of the electrical receptacle unit of FIG. 12A. The electrical receptacle unit 210 depicted in FIGS. 12A and 12B is similar in at least some respects to the electrical receptacle unit 110 depicted in FIGS. 7-11D. As discussed in greater detail below, the electrical receptacle unit 210 of FIGS. 12A and 12B includes a spring-biased locking bracket 216 that enhances locking functionality of the unit.

As shown in FIGS. 12A and 12B, the electrical receptacle unit 210 includes a female electrical fitting 212, a surrounding socket 213, and a plate 214 disposed at a front of the surrounding socket 213. The illustrated female fitting 212 is in the form of a panel-mount C13-type receptacle, but it will be appreciated that various other receptacle types with different electrical connection configurations also exist. In at least some embodiments, the plate 214 is integral with the socket 213, but, in other embodiments, the plate 214 may be attached during or after manufacturing. Further, in some contemplated embodiments, the plate is integral with, or attached to, the electrical fitting.

Figure 13:
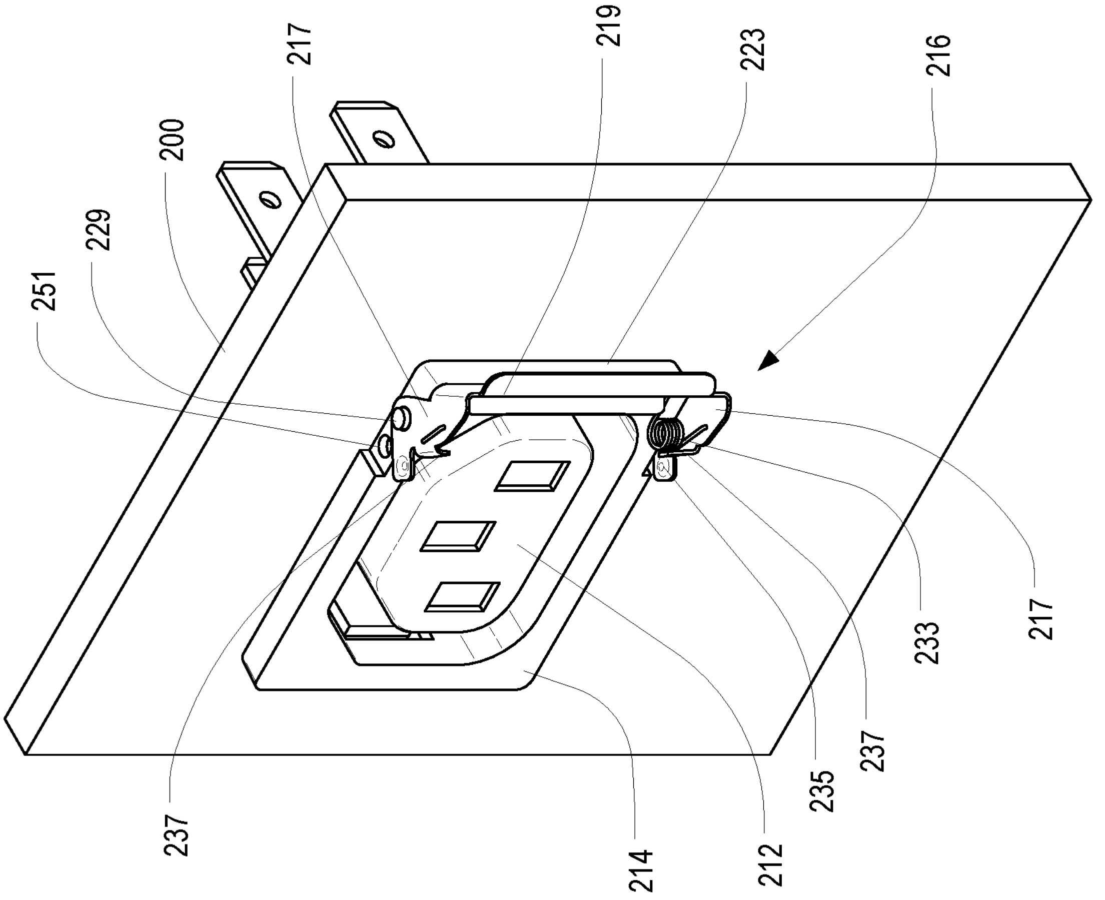
FIG. 13 is a front isometric view of the electrical receptacle unit of FIG. 12A shown mounted in a fixture, wherein the fixture is illustrated schematically.

FIG. 13 is a front isometric view of the electrical receptacle unit 210 of FIG. 12A shown mounted in a fixture 200, wherein the fixture 200 is illustrated schematically. The receptacle unit 210 may be mounted in various fixtures using screws, solder joints, or in other known ways; the receptacle (and especially the socket) may include additional features to facilitate such mounting. In accordance with one or more preferred approaches to mounting the receptacle unit 210, the walls of the socket 213 may include locking tabs 215 (as can be seen in FIG. 12A) that are naturally depressed as the socket 213 is maneuvered into position in the fixture 200, but are biased to spring outward when the socket 213 is fully inserted into such fixture 200, thereby holding the receptacle unit 210 in place in the fixture 200.

As can be seen in FIGS. 12A, 12B and 13, the electrical receptacle unit 210 further includes a spring-biased locking bracket 216. The spring-biased locking bracket 216 includes a flattened central portion 219 disposed between a pair of support arms 217. The support arms 217 extend toward sides of the plate 214 and are secured thereto via hinge pins 229. In a contemplated embodiment, the hinge pins 229 protrude outwardly away from the plate 214 and through corresponding apertures of the support arms 217. In this manner, the hinge pins 229 facilitate rotational movement of the spring-biased locking bracket 216 relative to the plate 214 so that the locking bracket can be maneuvered into and out of the locked position.

Each support arm 217 is further anchored to the plate via a spring 233 that biases the locking bracket 216 toward a locked position, whereby the spring-biased locking bracket 214 helps to secure, or lock, a plug that is received in the electrical receptacle unit 210. Each support arm 217 includes an angled tab 237 that extends inwardly adjacent to the spring 233 and a protrusion 235 that extends inwardly in generally the same direction as the angled tab 237. The tabs 237 shield the springs 233 from other structures and help to align the spring-biased locking bracket 216 against the plate 214 when the locking bracket is in the locked position. The inwardly-oriented protrusions 235 facilitate the spring-biased locking bracket 216 being snap-fit in the locked position, as will be explained in greater detail below.

In at least some embodiments, the locking bracket 216 is manufactured separately from the electrical receptacle unit 210 and is fastened thereto. It is contemplated that the spring-biased locking bracket 216 can be pre-installed or can be installed on the receptacle unit 210 after the receptacle unit 210 has been put into use. In this latter regard, the support arms 217 need only be deflected far enough away from one another to be fit at either side of the plate 214, with the hinge pins 229 received in corresponding apertures of the support arms 217. It is contemplated that deflection of the support arms 217 can be accomplished with the aid of a flat head screwdriver, which can be used as a lever against one of the support arms 217. The spring-biased locking bracket 216 can likewise be uninstalled from the receptacle unit 210 in a similar manner without the receptacle unit 210 needing to be removed or uninstalled. In at least some embodiments, it is contemplated that the spring-biased locking bracket 216 is made from a durable solid material, such as a hardened thin metal material.

Figure 14:
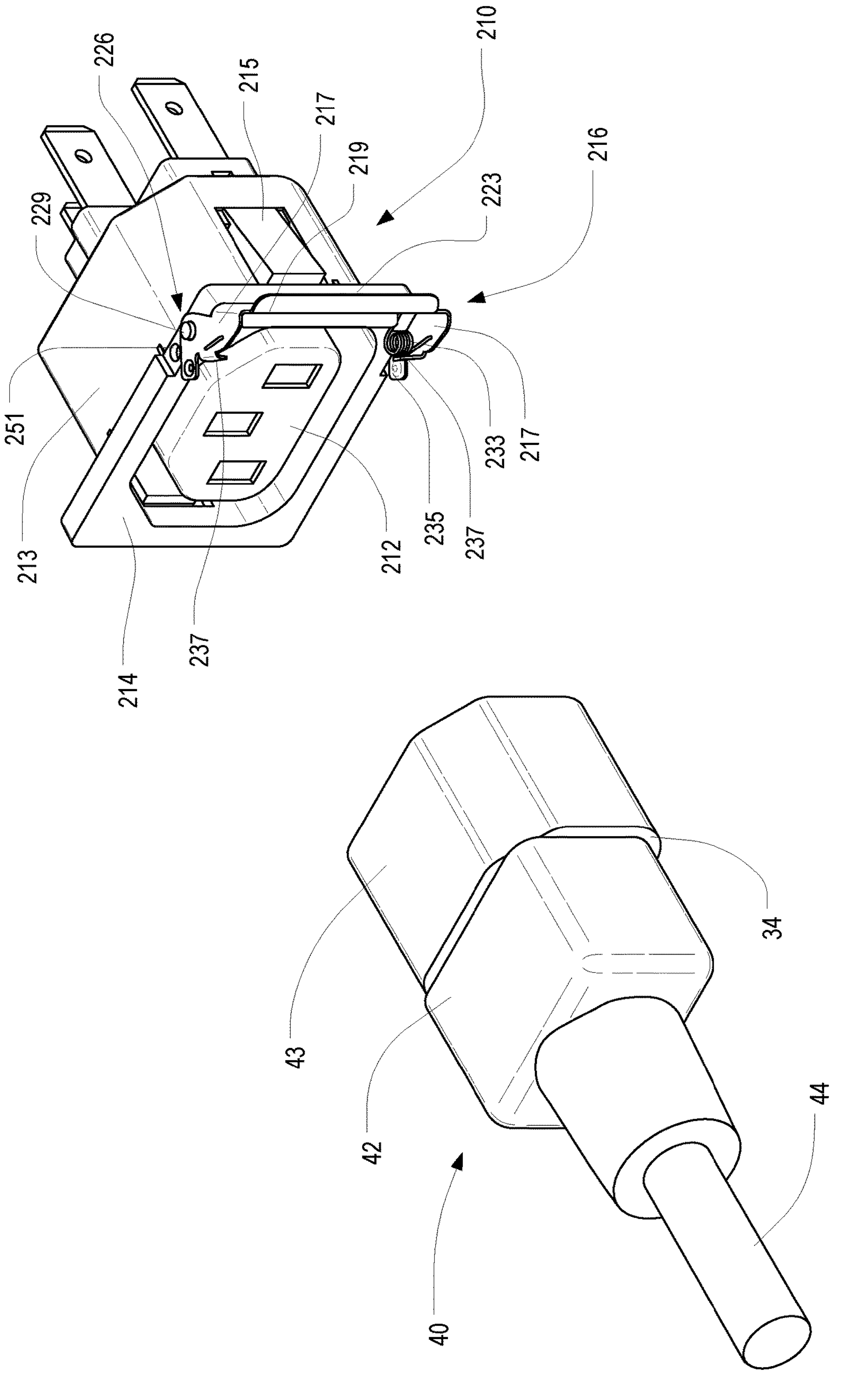
FIG. 14 is a front isometric view of the electrical receptacle unit of FIG. 12A, shown with an unconnected power cord.

The female electrical fitting 212 is adapted to receive a corresponding male electrical fitting. In this regard, FIG. 14 is a front isometric view of the electrical receptacle unit 210 of FIG. 12A, shown with an unconnected power cord. The power cord includes a plug 40 attached to the end of an electrical cable 44. The plug 40 includes a male fitting 42, from which male electrical contacts extend as well as a socket 43 surrounding the male electrical contacts. A ledge 34 is formed at the junction of the male fitting 42 and the socket 43, where trailing edges of the socket 43 extend beyond leading edges of the male fitting 42 (as the plug 40 is received in the receptacle unit 210). In at least some embodiments, the plug 40 is of conventional construction, as is the electrical cable 44 to which it is attached.

Figure 15A:
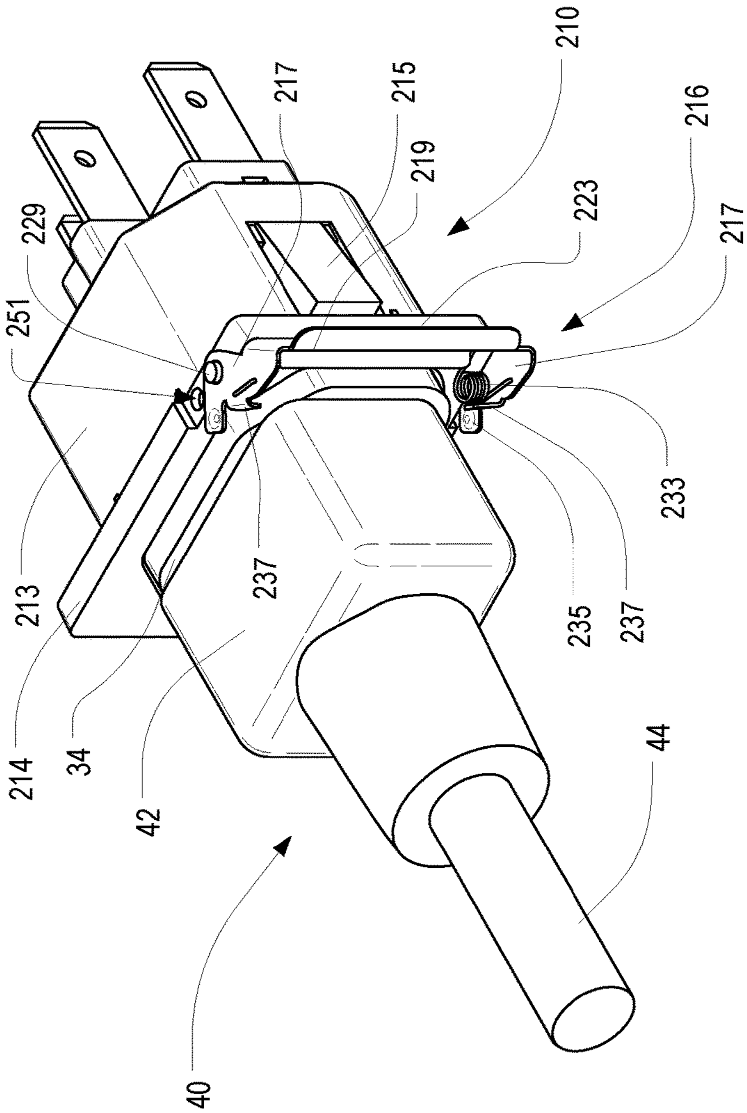
FIG. 15A is a front isometric view of the electrical receptacle unit of FIG. 12A, shown with a power cord connected thereto.
Figure 15B:
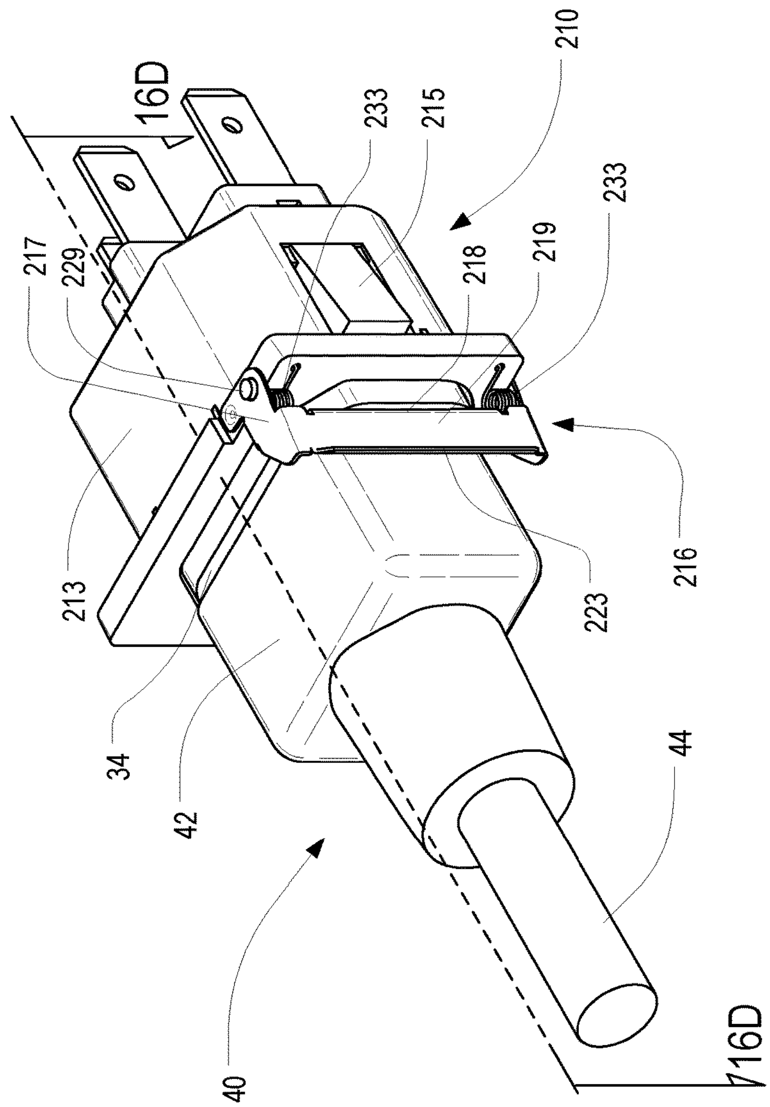
FIG. 15B is a front isometric view of the electrical receptacle unit of FIG. 12A, shown with the power cord connected thereto in a locked position.

The plug 40 may be inserted into the receptacle unit 210 such that a conventional electrical connection is established and maintained. In this regard, FIG. 15A is a front isometric view of the electrical receptacle unit 210 of FIG. 12A, shown with a power cord connected thereto, and FIG. 15B is a front isometric view of the electrical receptacle unit 210 of FIG. 12A, shown with the power cord connected thereto in a locked position. Because the spring-biased locking bracket 216 is biased toward the locked position, the locking bracket 216 should be pivoted away from the socket 213, against the bias of the spring 233, so as not to obstruct the plug 40 during insertion into the receptacle unit 210. Once fully seated in the socket 213, the plug 40 can be secured within the socket 213 by the spring-biased locking bracket 216. When in the locked position, the spring-biased locking bracket 216 is seated against the plate 214, and a lock tab 218 rests over the ledge 34 formed at the junction of the male fitting 42 and the plug socket 43. In so doing, the lock tab 218 obstructs the plug 40 such that it will not become "unplugged" or otherwise disconnected accidentally from the socket 213, thereby effectively locking the plug 40 into position. In a contemplated embodiment, the lock tab 218 extends, at an angle, from an inward-facing edge of the central portion 219 of the locking bracket 216 (as perhaps best seen in FIG. 16D).

FIGS. 16A-16D are a series of top views of the electrical receptacle unit 210 and plug 40 of FIGS. 14, 15A and 15B that illustrate locking and unlocking the spring-biased locking bracket 216 relative to the plug 40. In FIGS. 16A-16D, solid arrows are sometimes used to illustrate movement of various components of the locking bracket 216.

Figure 16A:
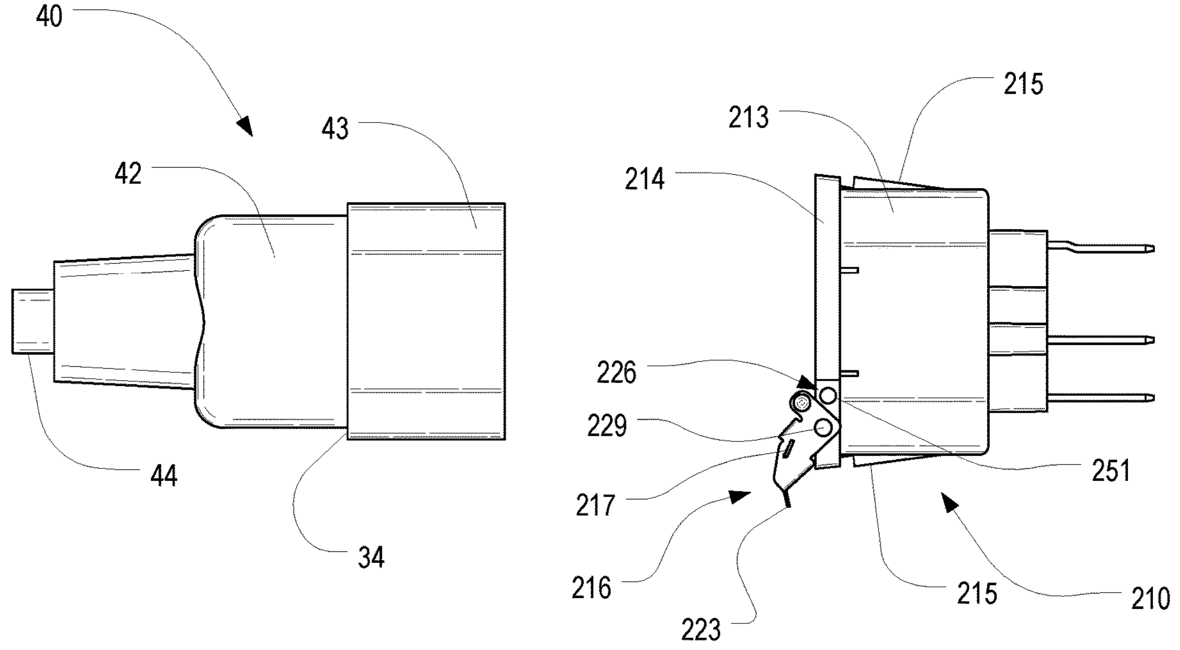
FIG. 16A is a top view of the electrical receptacle unit and plug of FIG. 14.

FIG. 16A is a top view of the electrical receptacle unit 210 and plug 40 of FIG. 14. In FIG. 16A, the spring-biased locking bracket 216 has been pivoted away from the socket 213, against the bias of the springs 233, so that the plug 40 can be received in the socket 213. With additional reference to FIGS. 12B and 14, distal ends of the support arms 217 are anchored to, and received within, notched areas 226 along opposed lateral edges of the plate 214. As the spring-biased locking bracket 216 is pivoted about the hinge pins 229, distal ends of the support arms 217 remain within the notched areas 226, thereby assisting with keeping the locking bracket 216 aligned relative to the receptacle unit 210. As shown in FIGS. 14 and 16A, each notched area 226 of the plate 214 includes a cavity 251, which is sized and shaped to receive a respective protrusion 235 of the support arms 217 when the locking bracket 216 is in the locked position.

As further shown in FIGS. 14 and 16A, the locking bracket 216 includes a grip tab 223 that extends outwardly and upwardly from a side of the central portion 219, opposite from the lock tab 218. The grip tab 223 provides a surface by which the spring-biased locking bracket 216 can be grasped and maneuvered by a user. For example, as the plug 40 is inserted into the receptacle unit 210, a user can apply a force against the grip tab 223 in order to maneuver the spring-biased locking bracket 216 out of the way (i.e., by pivoting the spring-biased locking bracket against the bias of the springs 233) to provide an unobstructed path to the plug 40.

Figure 16B:
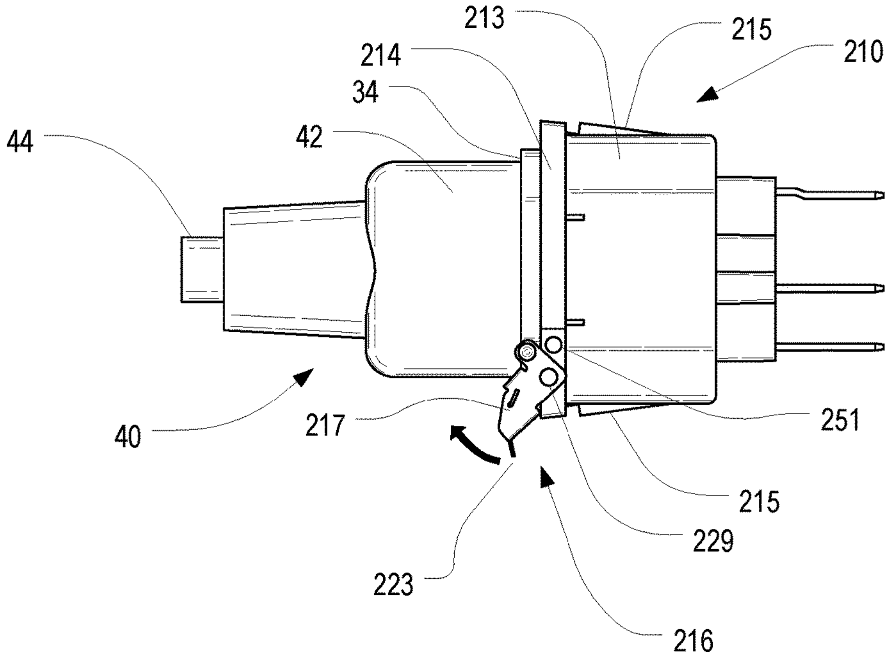
FIG. 16B is a top view of the electrical receptacle unit and plug of FIG. 15A.
Figure 16C:
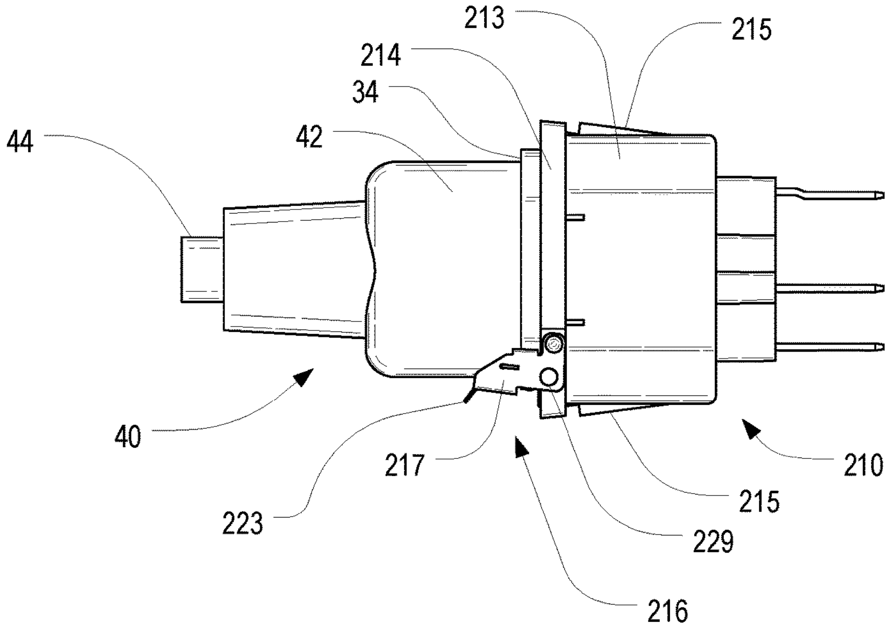
FIG. 16C is a top view of the electrical receptacle unit and plug of FIG. 15B.

FIG. 16B is a top view of the electrical receptacle unit 210 and plug 40 of FIG. 15A, and FIG. 16C is a top view of the electrical receptacle unit 210 and plug 40 of FIG. 15B. With the plug 40 in alignment with the female electrical fitting 212 of the socket 213 and the spring-biased locking bracket 216 maneuvered out of the way, the plug 40 can be received in the electrical receptacle unit 210 to establish an electrical connection therewith. Once properly seated, the grip tab 223 can be released by the user, thereby permitting the spring-biased locking bracket to pivot, about the hinge pins 229, toward the locked position. The direction of rotation is represented by a solid arrow in FIG. 16B.

In at least some embodiments, it is contemplated that the bias of the springs 233 is sufficient to cause the locking bracket 216 to return fully to the locked position upon release of the grip tab 223. When in the locked position, the lock tab 218 physically obstructs the plug 40 from being removed from the socket 213 and the inwardly-oriented protrusions 235 of the support arms are received in respective cavities 251 of the plate 214. In other contemplated embodiments, a slight external force, applied against the grip tab 223, may be necessary to cause the support arms 217 to be deflected outwardly by a sufficient margin such that the protrusions 235 can be received within the respective cavities 251 of the plate 214. In either case, it is contemplated that the protrusions 235 (perhaps best seen in FIG. 12B) are received within the respective cavities 251 of the plate 214 via snap-fit. In this manner, the protrusions 235 further encourage the spring-biased locking bracket 214 to remain in the locked position.

Figure 16D:
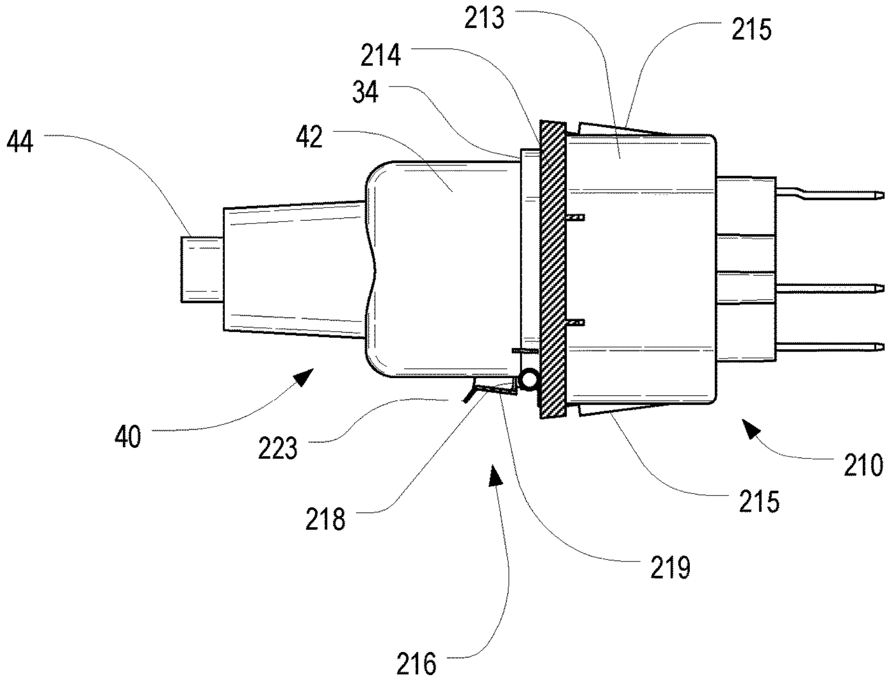
FIG. 16D is a top cross-sectional view of the electrical receptacle unit and plug of FIG. 15B, taken along line 16D-16D.

FIG. 16D is a top cross-sectional view of the electrical receptacle unit 210 and plug 40 of FIG. 15B, taken along line 16D-16D. In FIG. 16D, the spring-biased locking bracket 216 is shown in the locked position. Here, the lock tab 218 is positioned over the ledge 34 formed at the junction of the male fitting 42 and the plug socket 43, and the inwardly-oriented protrusions 235 are received within the cavities 251 of the plate 214. In the locked position, the lock tab 218 obstructs the plug 40 such that it will not become “unplugged” or otherwise disconnected accidentally from the socket 213. Additionally, with the protrusions 235 of the spring-biased locking bracket 216 seated within respective cavities 251 of the plate 214, the locking bracket is further encouraged to remain in the locked position. The hinge pins 229, which provide a pivot point for the locking bracket 216, are positioned such that a pulling force applied to the plug 40 does not cause the lock tab 218 to become disengaged.

It is contemplated that the spring-biased locking bracket 216 can be unlocked by applying a force against the grip tab 223 to unseat the protrusions 235 from the cavities 251 and then pivot the locking bracket 216 away from the plug 40 against the bias of the springs 233. In so doing, the lock tab 218 no longer obstructs the ledge 34, and the plug 40 is free to be removed from the socket 213.

Figure 17A:
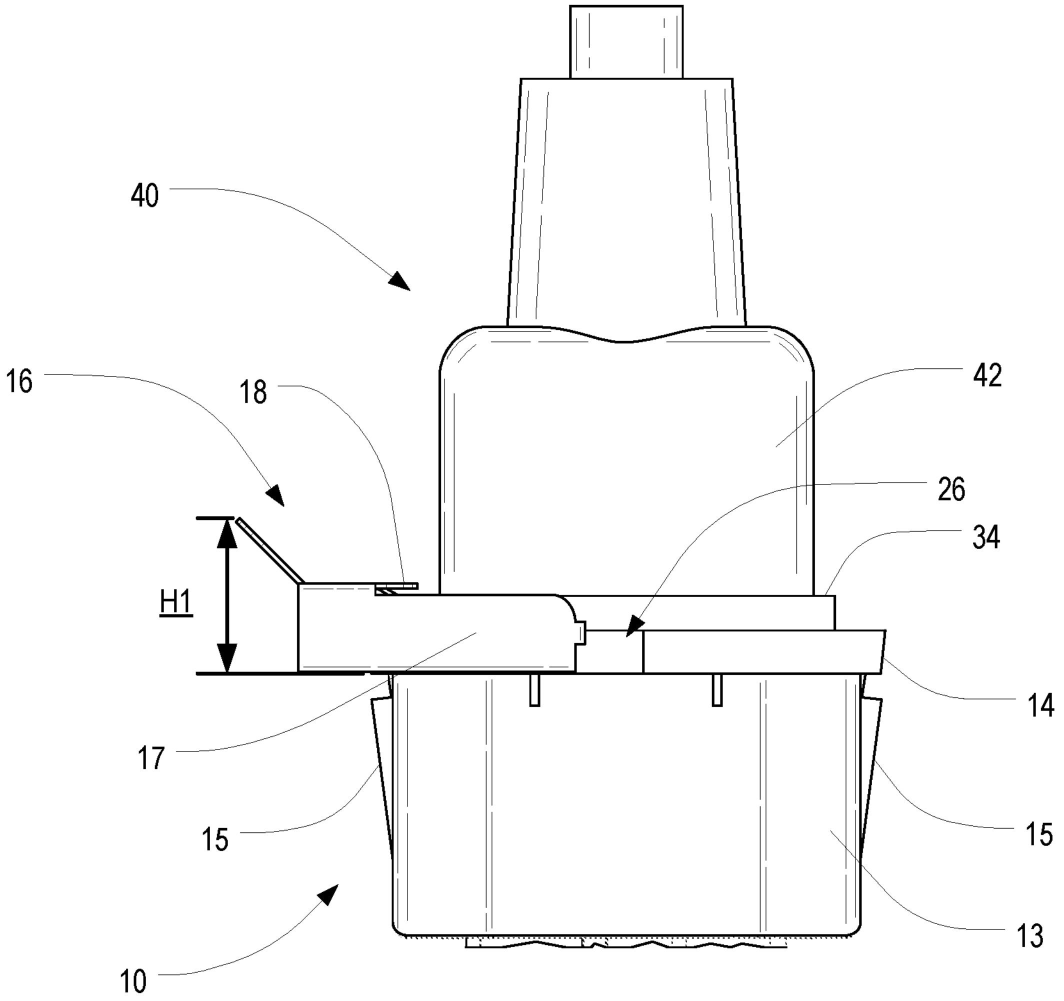
FIG. 17A is a top view of the electrical receptacle unit and plug of FIG. 5A, illustrating a height of the locking bracket in the unlocked position.
Figure 17B:
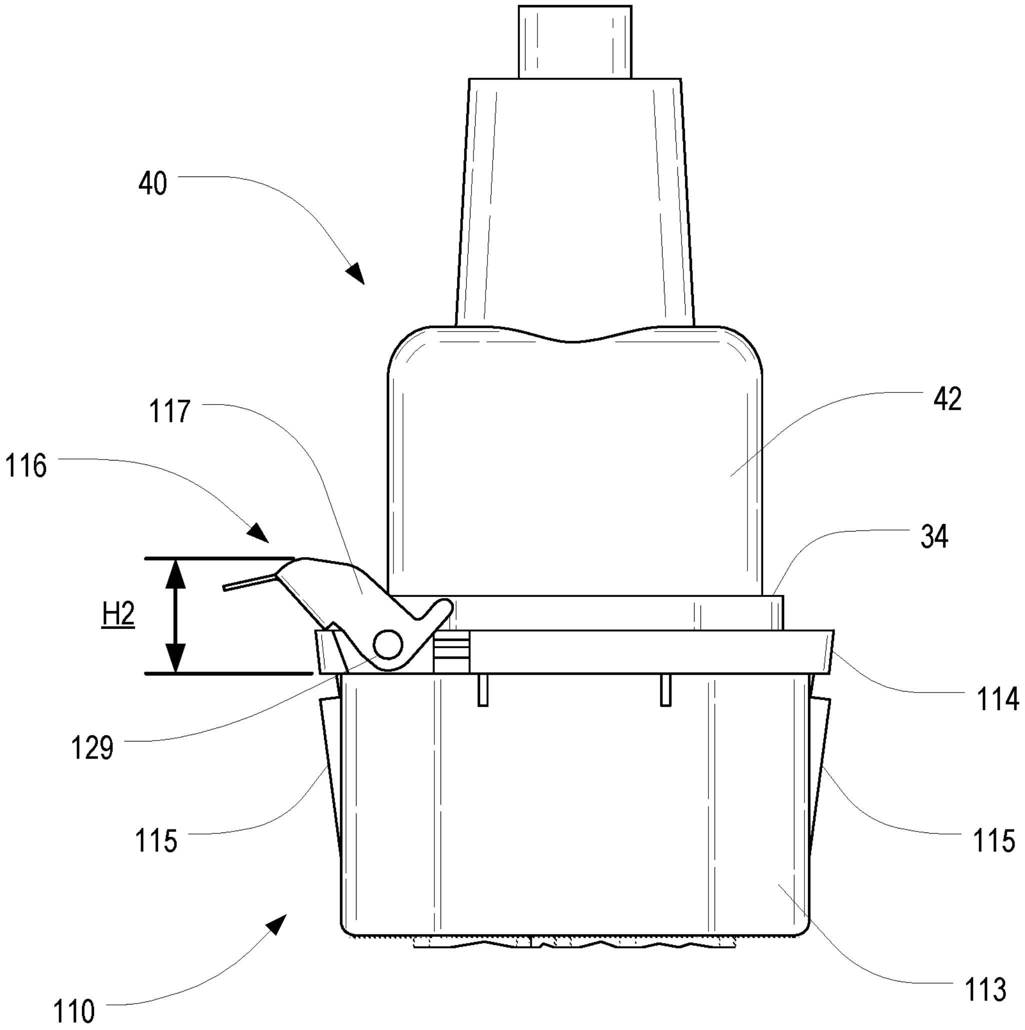
FIG. 17B is a top view of the electrical receptacle unit and plug of FIG. 10A, illustrating a height of the locking bracket in the unlocked position.

With respect to each of the embodiments described hereinabove, installation of the locking bracket 16,116,216 does not have a significant impact on the overall height of the receptacle unit 10,110,210, even when the locking bracket 16,116,216 is in the unlocked position. In this regard, FIG. 17A is a top view of the electrical receptacle unit 10 and plug 40 of FIG. 5A, illustrating a height H1 of the locking bracket 16 in the unlocked position, and FIG. 17B is a top view of the electrical receptacle unit 110 and plug 40 of FIG. 10A, illustrating a height 112 of the locking bracket 116 in the unlocked position. As shown in FIGS. 17A and 17B, the locking bracket 16,116 extends only a modest distance 111,112 above the top of the receptacle unit 10,110 in the unlocked position. As a result, the locking bracket 16,116 is less likely to interfere with other structures, including adjacent receptacle units or a surrounding enclosure.

With respect to each of the embodiments described hereinabove, dimensions of the locking brackets 16,116,216 are such that the overall footprint of the receptacle units 10,110, 210 in the stacking direction is not affected by installation of the locking brackets 16,116,216. In this regard, FIG. 18A is an end view of the electrical receptacle unit 10 and plug 40 of FIG. 5B, illustrating a footprint F1 of the locking bracket 16 in the stacking direction, and FIG. 18B is an end view of the electrical receptacle unit 110 and plug 40 of FIG. 10B, illustrating a footprint F2 of the locking bracket 116 in the stacking direction. The stacking direction refers to the direction that receptacle units “stack” along the length of a PDU. As shown in FIGS. 18A and 18B, installation of the locking bracket 16,116 does not expand the overall footprint F1,F2 of the receptacle unit 10,110. Support arms 17,117 engage at sides of the plate 14,114 within notched areas 26,126 so that the full length of the locking bracket 16,116 can be accommodated within the footprint of the receptacle unit 10,110 in the stacking direction. Furthermore, in the case of the receptacle unit of FIG. 18A, it is contemplated that the length of the plate 14 in the stacking direction can be slightly less at the portion that accommodates the locking bracket 16 than at the opposite end. In either embodiment, the ability to fit the locking bracket 16,116 to the receptacle unit 10,110 without expanding the footprint F1, F2 allows for more receptacle units to be populated per length of PDU.

Based on the foregoing information, it will be readily understood by those persons skilled in the art that the present invention is susceptible of broad utility and application. Many embodiments and adaptations of the present invention other than those specifically described herein, as well as many variations, modifications, and equivalent arrangements, will be apparent from or reasonably suggested by the present invention and the foregoing descriptions thereof, without departing from the substance or scope of the present invention.

Accordingly, while the present invention has been described herein in detail in relation to one or more preferred embodiments, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptations, variations, modifications or equivalent arrangements; the present invention being limited only by the claims appended hereto and the equivalents thereof.

What is claimed is:

1. An electrical receptacle unit with locking feature comprising:

a receptacle adapted to be electrically connected to a source of electricity, the receptacle including
an electrical fitting having electrical contacts contained therein and/or extending therefrom,
a socket surrounding the electrical fitting, and
a plate disposed at a front of the socket;
a locking bracket having a lock tab; and
at least one spring anchored between the locking bracket and the plate;
wherein the locking bracket is pivotably secured to the plate; and
wherein the at least one spring is biased to retain the locking bracket in a position whereby the lock tab obstructs a plug electrically seated within the socket from removal.

2. The electrical receptacle unit with locking feature of claim 1, wherein the receptacle is a panel-mount receptacle.

3. The electrical receptacle unit with locking feature of claim 2, wherein the socket of the receptacle includes walls, at least one of which walls includes a locking tab that retains the receptacle in a fixture.

4. The electrical receptacle unit with locking feature of claim 1, wherein the electrical fitting is a female electrical fitting having female electrical contacts contained therein.

5. The electrical receptacle unit with locking feature of claim 1, wherein the plug and receptacle are of a C13/C14-type.

6. The electrical receptacle unit with locking feature of claim 1, wherein the locking bracket includes a grip tab extending from a side thereof.

7. The electrical receptacle unit with locking feature of claim 1, wherein the locking bracket is made from a metal material.

8. The electrical receptacle unit with locking feature of claim 1, wherein a length of the locking bracket does not extend beyond a footprint of the receptacle in the stacking direction.

9. The electrical receptacle unit with locking feature of claim 1, wherein the lock tab extends from the locking bracket at an angle.

10. The electrical receptacle unit with locking feature of claim 1, wherein the locking bracket is secured to the plate via a hinge pin.

11. The electrical receptacle unit with locking feature of claim 10, wherein the locking bracket is pivotable between the first and second positions about the hinge pin.

12. The electrical receptacle unit with locking feature of claim 1, wherein the at least one spring is a coil-type spring.

13. The electrical receptacle unit with locking feature of claim 1, wherein the locking bracket is pivotable, against the bias of the at least one spring, so that the plug is unobstructed and removable from the socket.

14. A method of securing a plug to an electrical receptacle unit comprising:

providing an electrical receptacle unit having a female electrical fitting with a surrounding receptacle unit socket, a plate disposed at a front of the receptacle unit socket, a locking bracket pivotably secured to the plate, and at least one spring anchored between the locking bracket and the plate;
providing a plug having a male electrical fitting with male electrical contacts extending therefrom and a plug socket that surrounds the male electrical contacts;
pivoting an end of the locking bracket away from the plate, against a bias in the at least one spring, so that the plug is unobstructed;
positioning the plug within the receptacle unit socket to establish an electrical connection therewith; and
releasing the end of the locking bracket so that the bias in the at least one spring causes the locking bracket to enter and be retained in a locked position whereby a portion of the locking bracket obstructs the plug from removal.

15. The method of claim 14, wherein, in the locked position, a lock tab extending from the locking bracket is positioned to obstruct the plug from removal.

16. The method of claim 14, wherein a length of the locking bracket does not extend beyond a footprint of the electrical receptacle unit in the stacking direction.

17. The method of claim 14, wherein the plug and receptacle unit are of a C13/C14-type.

18. The method of claim 14, wherein the locking bracket includes a grip tab extending from a side thereof.

19. The method of claim 14, wherein the at least one spring is a coil-type spring.

20. The method of claim 14, wherein the locking bracket is secured to the plate via a hinge pin.

* * * * *